(12) United States Patent
Takatsuka

(10) Patent No.: US 11,356,573 B2
(45) Date of Patent: Jun. 7, 2022

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Yohei Takatsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 356 days.

(21) Appl. No.: 16/354,191

(22) Filed: Mar. 15, 2019

(65) Prior Publication Data
US 2020/0007702 A1 Jan. 2, 2020

(30) Foreign Application Priority Data

Jul. 2, 2018 (JP) .............................. JP2018-126280

(51) Int. Cl.
*H04N 1/00* (2006.01)
(52) U.S. Cl.
CPC ..... *H04N 1/00482* (2013.01); *H04N 1/00344* (2013.01); *H04N 1/00973* (2013.01); *H04N 2201/0094* (2013.01)
(58) Field of Classification Search
CPC .......... G06F 3/12–1298; G06F 2206/15–1514; G06K 15/00–026; G06K 15/16–1865; G06K 15/40–4095; G06K 2215/0002–0091; G06K 2215/0097; G06K 15/027–14; G06K 15/1867–225; G06K 2215/0094; G06K 2215/101–111; H04N 1/00095–0318; H04N 1/04–2392; H04N 1/32–32138; H04N 1/32358–36; H04N 1/42–4493; H04N 2201/0008–3267; H04N 2201/3273–33371; H04N 2201/33385–33392; H04N 1/00–00092; H04N 1/032–036; H04N 1/27–31; H04N 1/32144–32352; H04N 1/38–419; H04N 1/46–648; H04N 2201/00–0006; H04N 2201/3269–3271; H04N 2201/33378;
(Continued)

(56) References Cited

U.S. PATENT DOCUMENTS 8,200,523 B2 * 6/2012 Harashima ..... G06Q 10/063112
705/7.27
9,953,364 B2 * 4/2018 Masuko ................ G06F 3/0484
(Continued)

FOREIGN PATENT DOCUMENTS

| JP | H05334293 | 12/1993 |
|---|---|---|
| JP | 2001265596 | 9/2001 |
| JP | 2010033425 | 2/2010 |

OTHER PUBLICATIONS

"Office Action of Japan Counterpart Application", dated Apr. 19, 2022, with English translation thereof, p. 1-p. 6.

*Primary Examiner* — Negussie Worku
(74) *Attorney, Agent, or Firm* — JCIPRNET

(57) ABSTRACT

An information processing apparatus includes a reception section that receives a designation of an item to be an operation target on a screen used to operate data on a work which includes plural procedures, and a presentation section that presents a candidate value for the item, which is the operation target, and locational information of a procedure, in which the candidate value is extracted, on the screen.

15 Claims, 20 Drawing Sheets

(58) Field of Classification Search
CPC ........... H04N 1/00344; H04N 1/00482; H04N 1/00973; H04N 2201/0094; Y02D 10/159; F23N 2227/02; F23N 2227/04; F23N 2233/08; F23N 2235/06; F23N 2237/10; G05F 1/66
USPC ...................................................... 358/1.11
See application file for complete search history.

(56) References Cited

U.S. PATENT DOCUMENTS

| | | | | |
|---|---|---|---|---|
| 10,712,980 | B2* | 7/2020 | Nagasaki | G06F 3/1231 |
| 10,908,861 | B2* | 2/2021 | Tanaka | G06F 3/1204 |
| 11,061,631 | B2* | 7/2021 | Osuki | G06F 3/1229 |
| 11,108,879 | B2* | 8/2021 | Hachiya | G06F 3/1229 |
| 2009/0273802 | A1* | 11/2009 | Kajiyama | G06F 3/1257 |
| | | | | 358/1.15 |
| 2011/0225149 | A1* | 9/2011 | Takahashi | G06F 16/3338 |
| | | | | 707/723 |
| 2013/0086524 | A1* | 4/2013 | Nagao | G06F 3/0482 |
| | | | | 715/823 |
| 2013/0271367 | A1* | 10/2013 | Umekawa | A63F 13/533 |
| | | | | 345/156 |
| 2015/0134717 | A1* | 5/2015 | Naganuma | G06F 11/1464 |
| | | | | 709/201 |
| 2015/0185716 | A1* | 7/2015 | Wichmann | F01K 23/101 |
| | | | | 700/287 |
| 2016/0030847 | A1* | 2/2016 | Odate | A63F 13/58 |
| | | | | 463/31 |
| 2016/0092804 | A1* | 3/2016 | Shikano | G06Q 10/0633 |
| | | | | 705/7.27 |
| 2017/0200122 | A1* | 7/2017 | Edson | H04L 63/104 |
| 2019/0164326 | A1* | 5/2019 | Hatada | G06K 9/6215 |
| 2019/0311578 | A1* | 10/2019 | Sensui | A63F 13/69 |

* cited by examiner

FIG. 6

RELATION SET

| # | LABEL | RELATION BETWEEN PROCEDURES | ATTRIBUTE CONDITION |
|---|---|---|---|
| 1 | NEW STEP | HIGHER PROCEDURE | NON |
| 2 | STEP SUBSEQUENT TO COMPLETION | SUBSEQUENT PROCEDURE | ATTRIBUTE [STATUS] = = "COMPLETION" |
| 3 | STEP PREVIOUS TO COMPLETION OF APPROVAL | PREVIOUS PROCEDURE | ATTRIBUTE [APPROVAL] = = "true" |
| 4 | END STEP | ENDING POINT PROCEDURE | NON |

| # | LABEL | ATTRIBUTE |
|---|---|---|
| 1 | NEW STEP | APPROVER |
| 2 | STEP PREVIOUS TO COMPLETION OF APPROVAL | PERSON IN CHARGE |

FIG. 20

| # | LABEL | ATTRIBUTE |
|---|---|---|
| 1 | NEW STEP | APPROVER |
| 2 | STEP SUBSEQUENT TO COMPLETION | PERSON IN CHARGE |
| 3 | STEP PREVIOUS TO COMPLETION OF APPROVAL | PERSON IN CHARGE |
| 4 | END STEP | PERSON IN CHARGE | ature
INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-126280 filed Jul. 2, 2018.

BACKGROUND

(i) Technical Field

The present invention relates to an information processing apparatus and a non-transitory computer readable medium storing a program.

(ii) Related Art

There is a data mining technology for generating a correlation rule such that a correlation coefficient between attributes included in a database is equal to or larger than a predetermined value.

JP2001-265596A is an example of the related art.

SUMMARY

In a correlation rule focused on a height of a correlation between attributes, it is not possible to reflect a relation between procedures to which respective attribute values belong as candidates of the attribute values.

Aspects of non-limiting embodiments of the present disclosure relate to an information processing apparatus and a non-transitory computer readable medium storing a program, in which it is possible to reflect the relation between the procedures to the candidates of the attribute values, unlike a case of using the correlation rule focused on the height of the correlation between the attributes.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a reception section that receives a designation of an item to be an operation target on a screen used to operate data on a work which includes a plurality of procedures; and a presentation section that presents a candidate value for the item, which is the operation target, and locational information of a procedure, in which the candidate value is extracted, on the screen.

BRIEF DESCRIPTION OF THE DRAWINGS

Exemplary embodiment(s) of the present invention will be described in detail based on the following figures, wherein:

FIG. 6 is a diagram illustrating an example of a relation set;

FIG. 20 is a diagram illustrating an example of a change rule set which is generated using a method according to a first modification example.

DETAILED DESCRIPTION

Hereinafter, exemplary embodiments of the present invention will be described with reference to the accompanying drawings.

First Exemplary Embodiment

System Configuration

Figure 1:
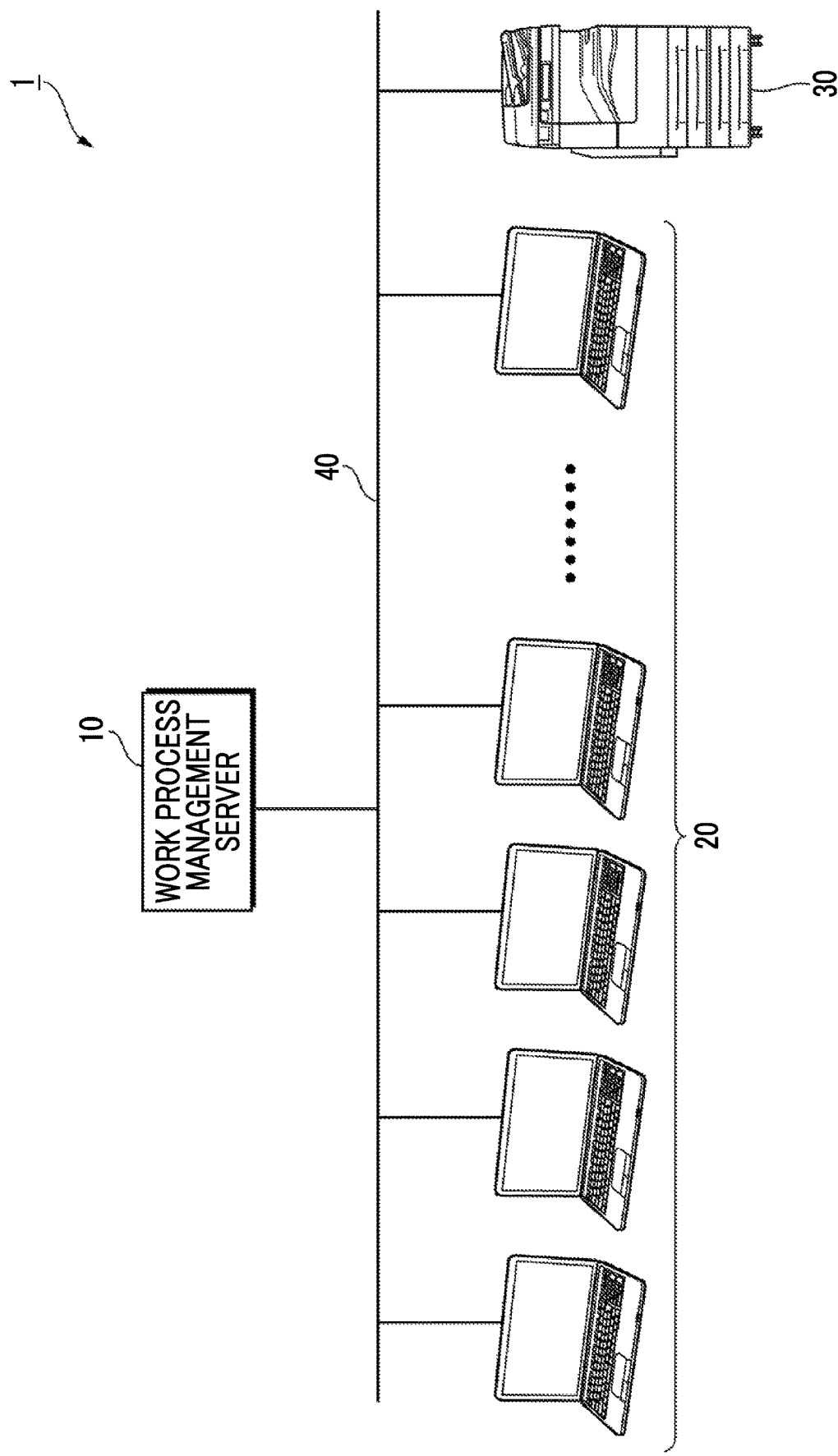
FIG. 1 is a diagram illustrating an example of a configuration of a work management system according to a first exemplary embodiment.

FIG. 1 is a diagram illustrating an example of a configuration of a work management system 1 according to a first exemplary embodiment.

The work management system 1 according to the first exemplary embodiment has a configuration in which a work process management server 10 which manages data relevant to a work process, a terminal 20 which is operated by a worker, and an image forming apparatus 30 which has a printing function, a copy function, a scanning function, and a FAX function, are connected to a network 40.

Here, the terminal 20 includes, for example, a desktop computer, a notebook-type computer, a smart phone, and a wearable terminal.

The network 40 includes, for example, a local network and the Internet.

Work Process

Figure 2:
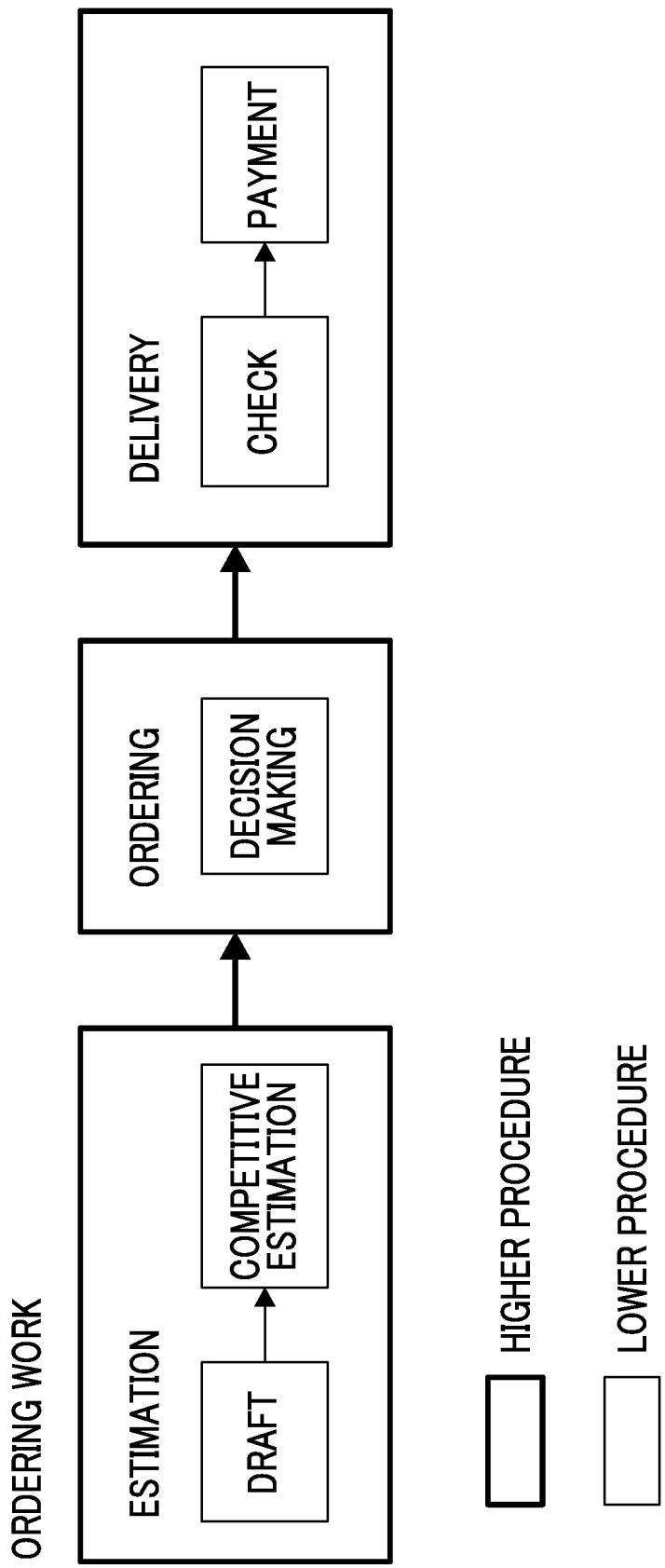
FIG. 2 is a diagram illustrating an example of a work process.

FIG. 2 is a diagram illustrating an example of a work process.

The work process illustrated in FIG. 2 indicates an ordering work.

The work process includes a plurality of procedures.

The work process relevant to the ordering work includes, for example, an "estimation procedure", an "ordering procedure", and a "delivery procedure" in a downstream direction from an upstream side. In the exemplary embodiment, the three procedures are referred to as a higher procedure.

The higher procedure includes a lower procedure. The "estimation procedure" includes, for example, a "draft procedure" and a "competitive estimation procedure". The "ordering procedure" includes, for example, a "decision making procedure". The "delivery procedure" includes, for example, a "check procedure" and a "payment procedure".

In the exemplary embodiment, an order relation between subsequent procedures is referred to as a sequence relation.

For example, the ordering procedure is a subsequent procedure of the estimation procedure and is a previous procedure of the delivery procedure. In the same manner, the competitive estimation procedure is a subsequent procedure of the draft procedure and is a previous procedure of the decision making procedure.

In addition, in the exemplary embodiment, the higher procedure and the lower procedure, which have a correspondence relation, are referred to as being in a hierarchical relation.

For example, the estimation procedure is the higher procedure of the draft procedure and the competitive estimation procedure. In contrast, the draft procedure and the competitive estimation procedure are the lower procedures of the estimation procedure.

Furthermore, in the exemplary embodiment, a start procedure of the work process is referred to as a starting point procedure, and an end procedure is referred to as an ending point procedure. In a case of FIG. 2, the starting point procedure is the draft procedure, and the ending point procedure is the payment procedure.

In the exemplary embodiment, each relation between the procedures is referred to as a relation between the procedures. The relation between the procedures is expressed using a specific procedure, which is an editing target, as a starting point.

In each procedure, an attribute is defined, and a value is set for each attribute.

The attribute includes, for example, a person in charge, an approver, the amount of money, an approval, a status, and the like. Content of the defined attribute differs depending on the procedure. In addition, a format of the value corresponding to each attribute is determined.

Meanwhile, the attribute is an example of an item which is displayed on an operation screen. In addition, the status is an example of information relevant to progress of the procedure.

Work Process Management Server

Figure 3:
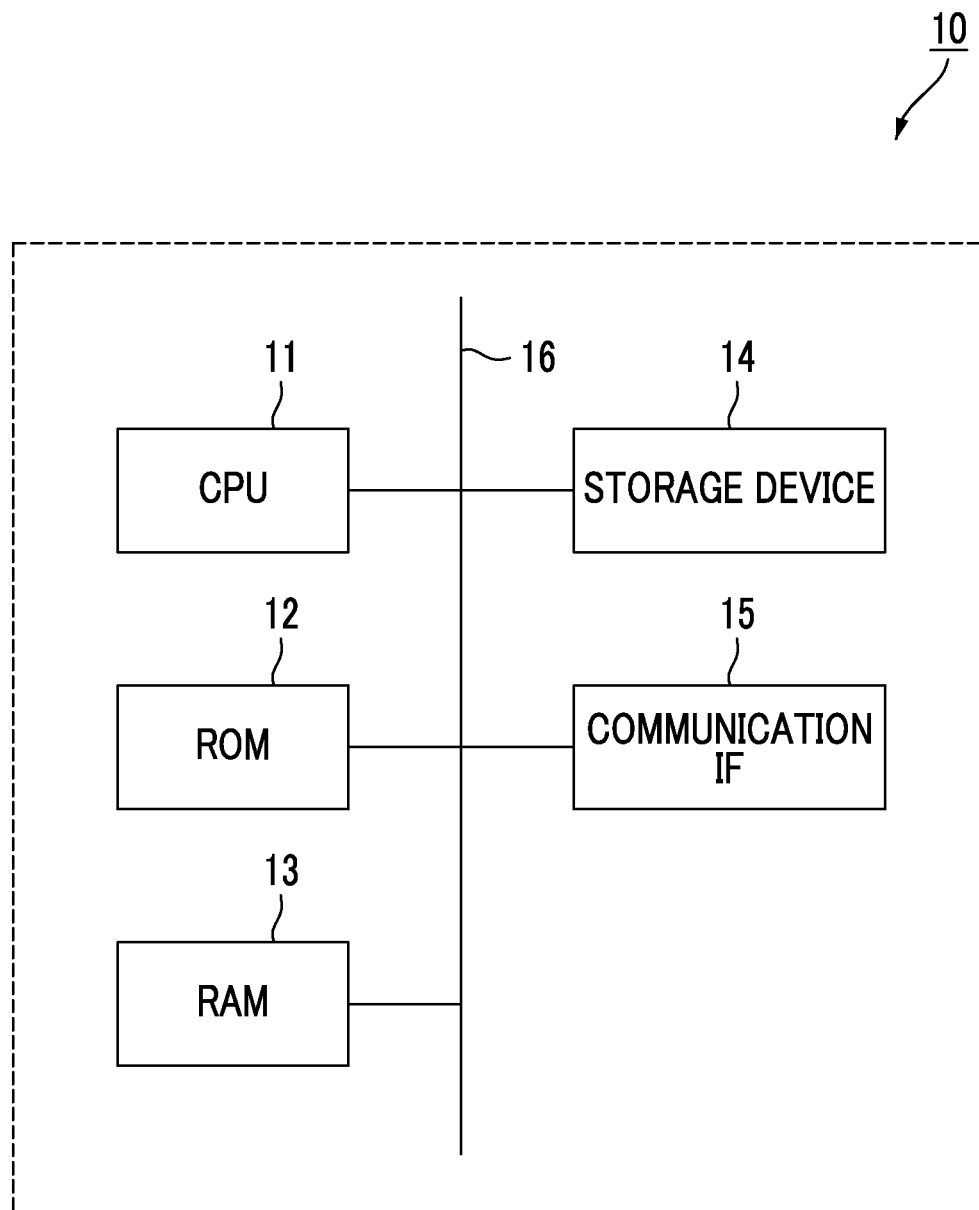
FIG. 3 is a diagram illustrating an example of a hardware configuration of a work process management server according to the first exemplary embodiment.

FIG. 3 is a diagram illustrating an example of a hardware configuration of the work process management server 10 according to the first exemplary embodiment.

The work process management server 10 includes a Central Processing Unit (CPU) 11 which controls a whole apparatus by executing a program (including basic software), a ROM 12 which stores a program, such as a Basic Input Output System (BIOS) or basic software, and a Random Access Memory (RAM) 13 which is used as a program execution area.

The CPU 11, the ROM 12, and the RAM 13 are included in a so-called computer, and process various types of information. Meanwhile, the ROM 12 includes a non-volatile semiconductor memory.

A storage device 14 includes, for example, a hard disk device, and stores an application program used to provide a work process management service, data relevant to the work process, and the like.

The communication interface (communication IF) 15 is used for connection to the network 40 (see FIG. 1).

Figure 4:
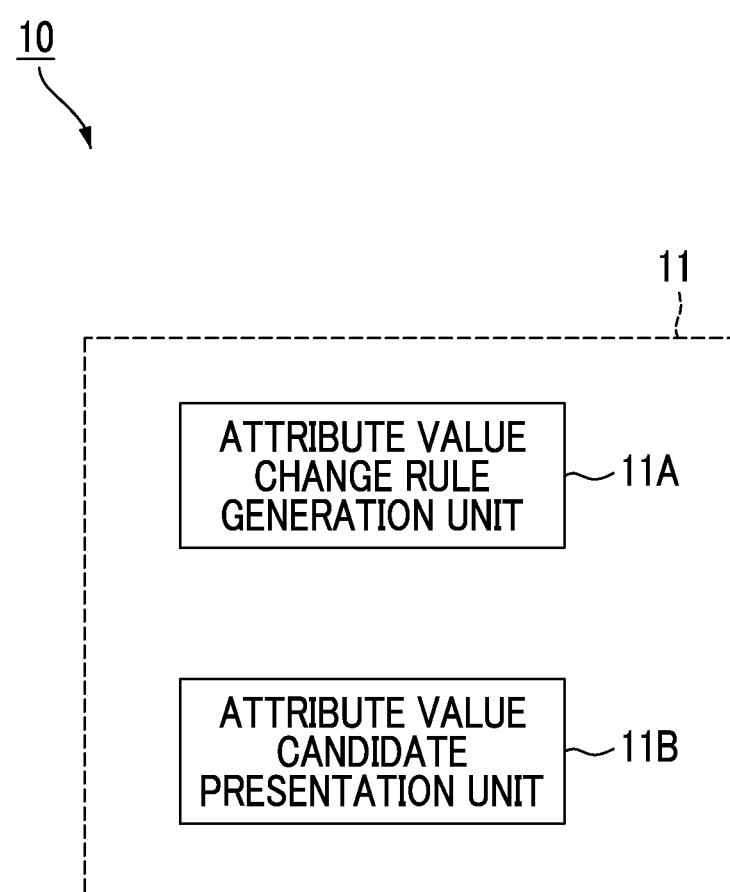
FIG. 4 is a diagram illustrating an example of a functional configuration of the work process management server according to the first exemplary embodiment.

FIG. 4 is a diagram illustrating an example of a functional configuration of the work process management server 10 according to the first exemplary embodiment.

The functional configuration illustrated in FIG. 4 is realized by executing the application program by the CPU 11.

As illustrated in FIG. 4, the work process management server 10 functions as an attribute value change rule generation unit 11A which generates a rule used to support a subsequent job, and an attribute value candidate presentation unit 11B which presents candidate values (recommendation values) to a user by applying the generated rule to the job.

Functional Configuration Relevant to Attribute Value Change Rule Generation Unit 11A First, a functional configuration and a processing operation, which are relevant to the attribute value change rule generation unit 11A, will be described.

Figure 5:
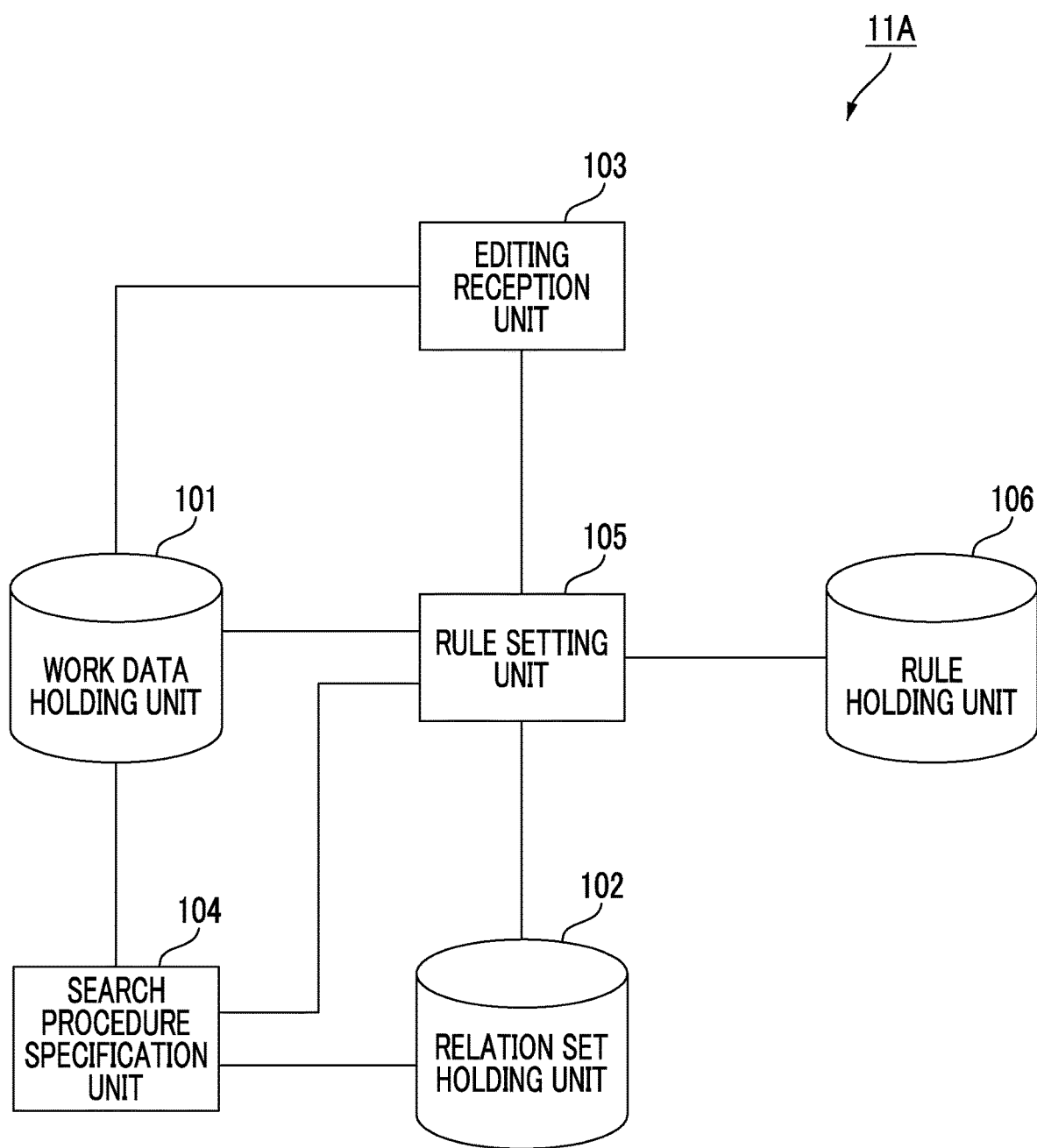
FIG. 5 is a diagram illustrating an example of a functional configuration of an attribute value change rule generation unit.

FIG. 5 is a diagram illustrating an example of the functional configuration of the attribute value change rule generation unit 11A.

The attribute value change rule generation unit 11A is realized by a work data holding unit 101 which holds data (work data) relevant to the work process, a relation set holding unit 102 which holds a relation set that prescribes a range to be searched to generate the rule in the work process, an editing reception unit 103 which receives editing of the work data through the operation screen of the terminal 20 (see FIG. 1), a search procedure specification unit 104 which specifies a procedure corresponding to a search target by applying the relation set to an edited procedure, a rule setting unit 105 which sets up a rule used to extract an attribute value in a predetermined relation with respect to the attribute value acquired after editing, and a rule holding unit 106 which holds the generated rule.

The editing reception unit 103 is an example of a reception section.

The relation set is a set of relations which prescribe procedures highly relevant to a procedure designated as the editing target.

FIG. 6 is a diagram illustrating an example of the relation set.

The relation set illustrated in FIG. 6 is prescribed using a number # which distinguishes the relation, a label, the relation between the procedures, and a condition (attribute condition) which is required for an attribute.

The attribute condition prescribes a condition which is required for an attribute value of a procedure in a specific relation. Here, the attribute condition is random.

The label expresses information specified using the relation between the procedures and the attribute condition. The information of the label is also used in a case of presenting the candidate values which will be described later.

The relation set illustrated in FIG. 6 includes four relations 1 to 4.

A label "new step" is attached to the relation 1. The relation 1 prescribes that a higher procedure of a procedure corresponding to the editing target is set to the search target.

A label "step subsequent to completion" is attached to the relation 2. The relation 2 prescribes that a subsequent procedure of the procedure corresponding to the editing target is set to the search target. Here, the subsequent procedure is required that a value of the "status" is completion.

A label "step previous to completion of the approval" is attached to the relation 3. The relation 3 prescribes that a procedure previous to the procedure corresponding to the editing target is set to the search target. Here, the previous procedure is required that a value of the "approval" is true.

A label "end step" is attached to the relation 4. The relation 4 prescribes that the ending point procedure, which is performed at the end of the work process, is set to the search target.

In the exemplary embodiment, a procedure lowly relevant to the procedure corresponding to the editing target is excluded from the rule using the relation set. In other words, the rule is generated from the procedure highly relevant to the procedure corresponding to the editing target, and thus the attribute value desired for the user is easily included in the candidate and efficiency of the job is expected.

Most of all, a configuration which does not use the relation set, that is, a configuration in which the relation set holding unit 102 and the search procedure specification unit 104 are not used is possible.

In a case where the relation set holding unit 102 and the search procedure specification unit 104 are not used, the rule setting unit 105 sets up the rule by searching all the procedures which are included in the work process. Here, the rule setting unit 105 is an example of a search section and is an example of a setting section.

Process for Setting Rule

Hereinafter, content of a process for setting the rule from the work data (data on a work) will be described with reference to FIGS. 7 to 12.

Figure 7:
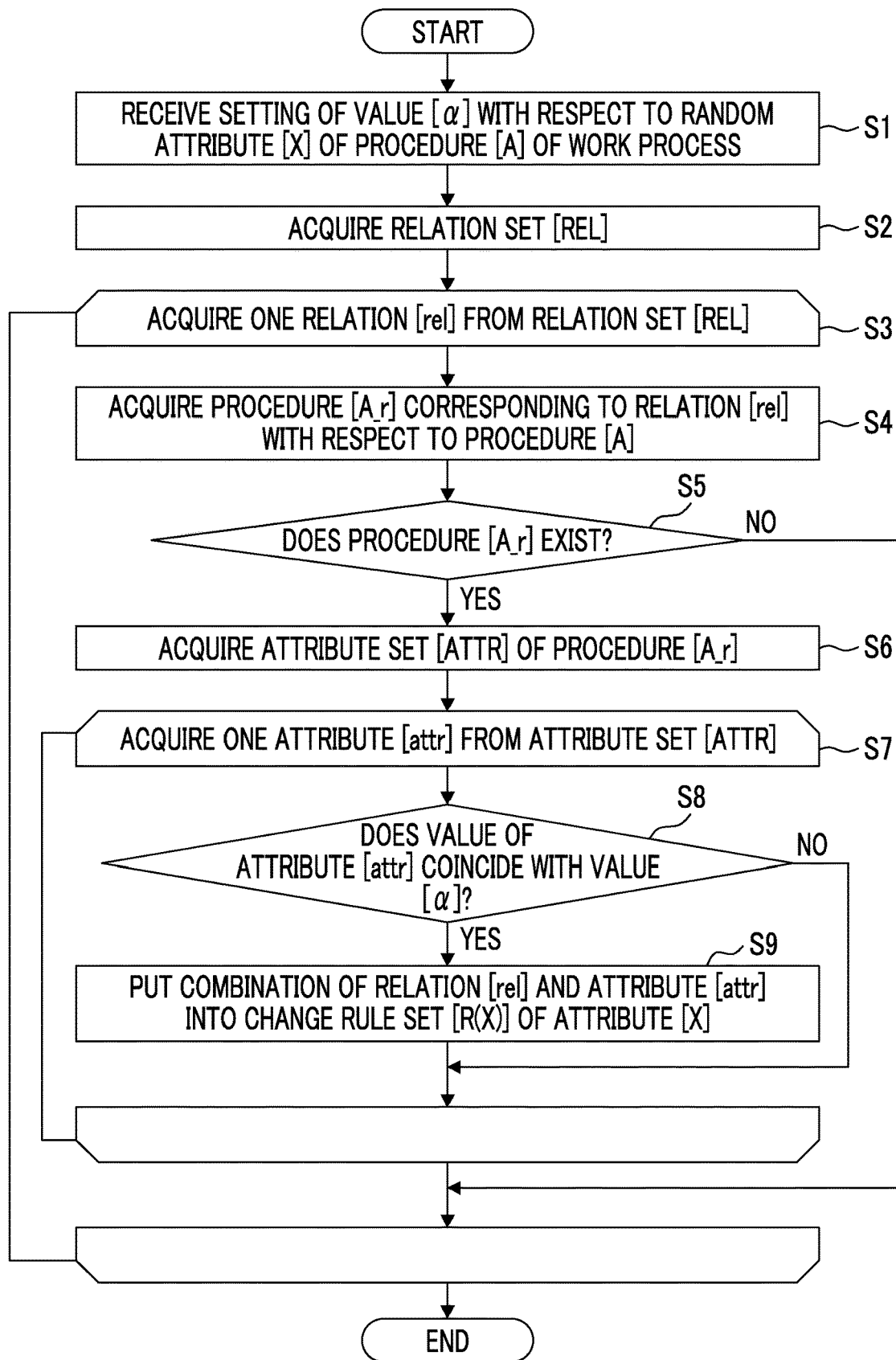
FIG. 7 is a flowchart illustrating an example of a sequence of setting a rule performed in a case where work data is edited.

FIG. 7 is a flowchart illustrating an example of a sequence of setting a rule performed in a case where the work data is edited. In FIG. 7, a step is written in S.

First, the editing reception unit 103 (see FIG. 5) receives a setting of a value [α] with respect to a random attribute [X] of a procedure [A] of the work process through the operation screen (step S1). Here, the value [α] is an example of a first value.

In a case of the exemplary embodiment, the work process is the ordering work, the procedure [A] is the competitive estimation procedure, the attribute [X] is the person in charge, and the attribute value is xYAMA JIRO.

Figure 8:
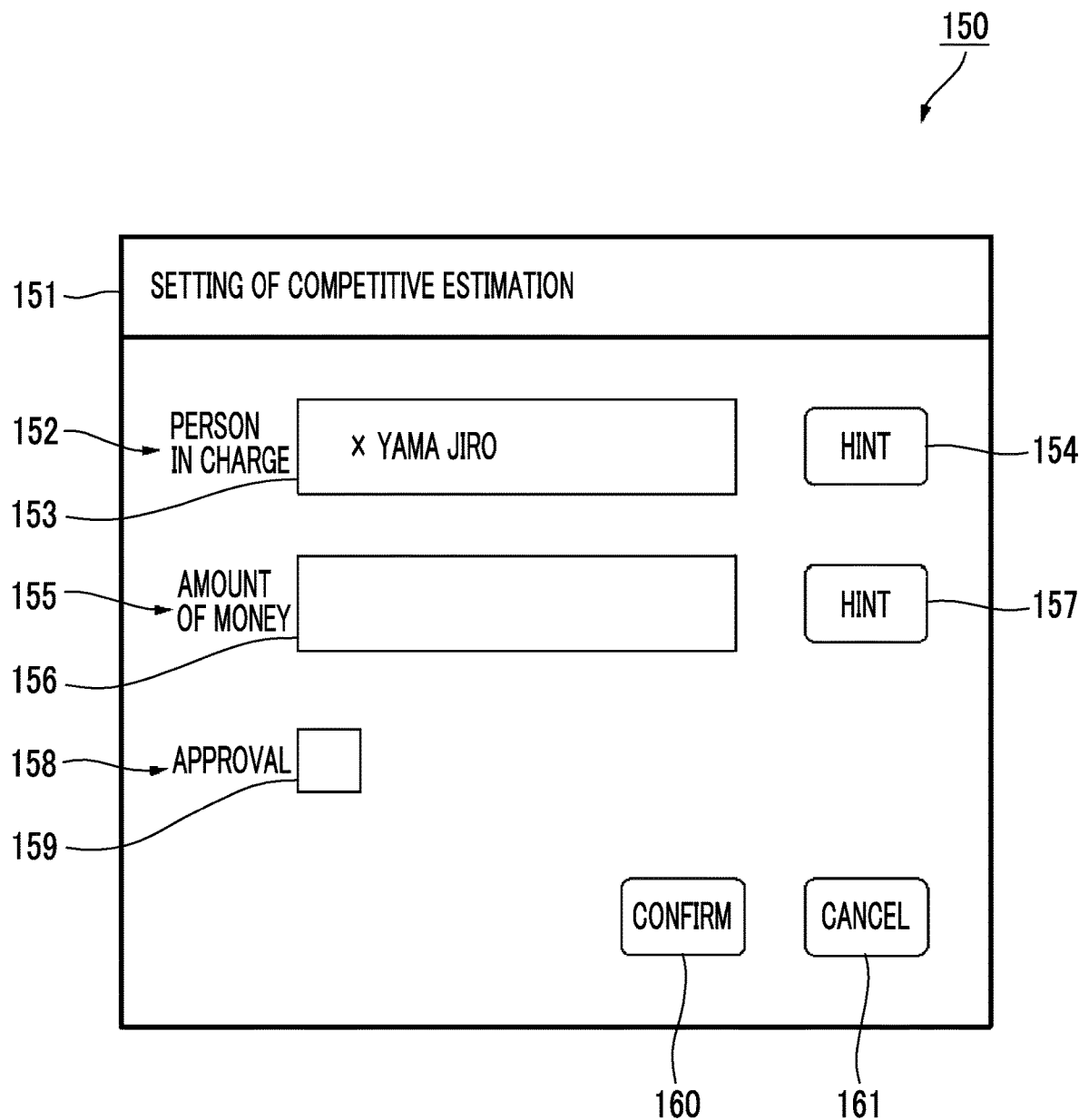
FIG. 8 is a diagram illustrating an example of an editing screen used to set attribute values relevant to a competitive estimation procedure.

FIG. 8 is a diagram illustrating an example of an editing screen 150 used to set attribute values relevant to the competitive estimation procedure.

Therefore, "setting of competitive estimation" is written in a title field 151.

A person in charge 152, the amount of money 155, and an approval 158, which correspond to the attributes defined for the competitive estimation procedure, are displayed on the editing screen 150.

Value input fields 153 and 156 and hint buttons 154 and 157 are prepared for the person in charge 152 and the amount of money 155. In a case where the hint buttons 154 and 157 are operated, candidates of the values to be input to the input fields 153 and 156 are presented.

A checkbox 159 is prepared for the approval 158. A case where the checkbox 159 is checked indicates completion of the approval, and a case where the checkbox 159 is not checked indicates a non-approval.

Furthermore, a confirmation button 160 used to confirm content of editing and a cancellation button 161 used to cancel the content of the editing are displayed on the editing screen 150.

In the example of FIG. 8, "xYAMA JIRO" is input as a value corresponding to the person in charge 152.

Figure 9:
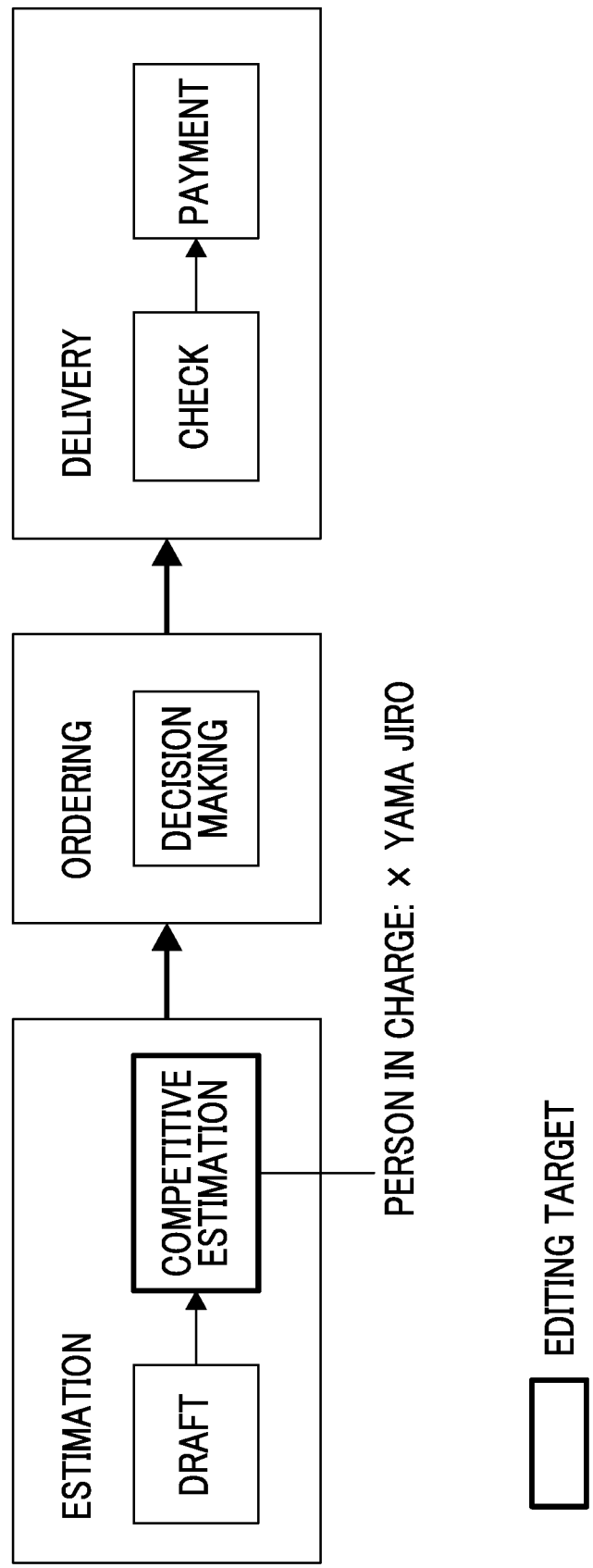
FIG. 9 is a diagram illustrating a location of the competitive estimation procedure, which is an editing target, and contents of the set attribute values.

FIG. 9 illustrates a detailed example of a procedure, which is a setting target, and the set value.

FIG. 9 is a diagram illustrating a location of the competitive estimation procedure, which is the editing target, and the content of the set attribute value.

In FIG. 9, a competitive estimation procedure, which is a current editing target, is illustrated by being surrounded using a thick-bordered box. The attribute "person in charge" is set to "xYAMA JIRO".

Returning to description with reference to FIG. 7.

Setting information, which is received by the editing reception unit 103 (see FIG. 5), is given to the search procedure specification unit 104 (see FIG. 5) through the rule setting unit 105.

The search procedure specification unit 104 acquires a relation set [REL] from the relation set holding unit 102 (see FIG. 5) (step S2).

The relation set [REL] according to the exemplary embodiment includes four relations [rel], as illustrated in FIG. 6.

Subsequently, the search procedure specification unit 104 acquires one relation [rel] from the relation set [REL] (step S3).

The relations [rel] are elements of the relation set [REL].

Here, the relations [rel] are sequentially acquired from number #1 and the processes in steps S3 to S9 are repeatedly performed until a non-processed relation [rel] does not exist.

The search procedure specification unit 104 acquires a procedure [A_r] corresponding to the relation [rel] (for example, the new step) with respect to the procedure "A" (that is, the competitive estimation procedure) (step S4).

Here, the relation [rel] includes not only the relation between the procedures but also the attribute condition. That is, the procedure [A_r] satisfies not only the relation between the procedures but also the attribute condition.

Figure 10:
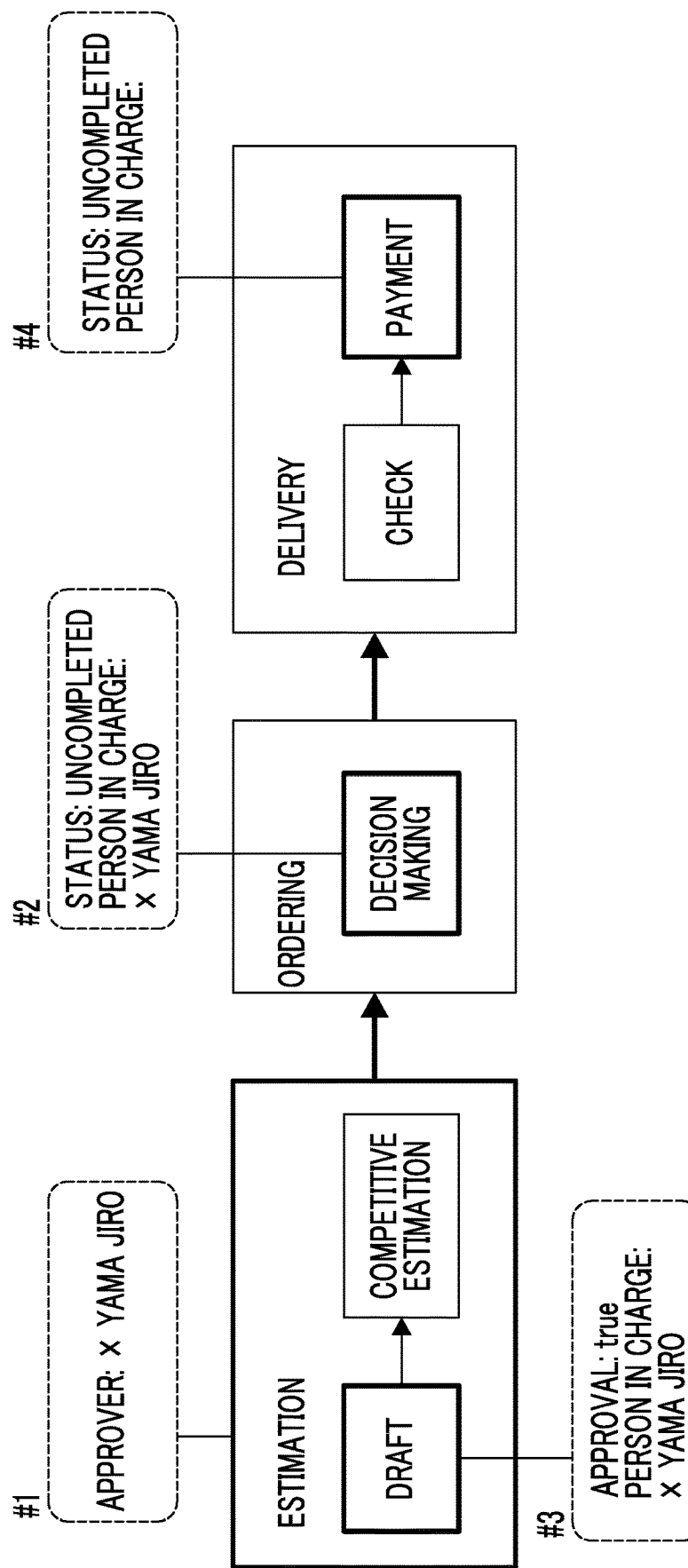
FIG. 10 is a diagram illustrating examples of a location of a procedure which satisfies a relation between procedures prescribed through relations of numbers #1 to #4, and the attribute values of the respective procedures in a case where the editing target is the competitive estimation procedure.

FIG. 10 is a diagram illustrating examples of a location of a procedure, which satisfies the relation between the procedures prescribed through relations [rel] of numbers #1 to #4, and the attribute values of the respective procedures in a case where the editing target is the competitive estimation procedure.

In FIG. 10, the procedure, which satisfies the relation between the procedures prescribed through the relations [rel] of numbers #1 to #4, is illustrated using a thick-bordered box.

The procedure, which satisfies the relation between the procedures, corresponding to number #1 is the estimation procedure corresponding to a higher procedure of the competitive estimation procedure.

In the same manner, the procedure, which satisfies the relation between the procedures, corresponding to number #2 is the decision making procedure corresponding to a subsequent procedure of the competitive estimation procedure.

In the same manner, the procedure, which satisfies the relation between the procedures, corresponding to number #3 is the draft procedure corresponding to a previous procedure of the competitive estimation procedure.

In the same manner, the procedure, which satisfies the relation between the procedures, corresponding to number #4 is the payment procedure corresponding to the ending point procedure.

In FIG. 10, "xYAMA JIRO" is set as a value of an attribute [approver] of the estimation procedure.

In addition, "true" is set as a value of an attribute "approval" of the draft procedure and "xYAMA JIRO" is set as a value of the attribute "person in charge".

In addition, "uncompleted" is set as a value of an attribute "status" of the decision making procedure, and "xYAMA JIRO" is set as a value of the attribute "person in charge".

In addition, "uncompleted" is set as a value of the attribute "status" of the payment procedure which is the ending point procedure, and the value of the attribute "person in charge" is not set.

Therefore, in the example of FIG. 10, the procedure [A_r] exists in the respective relations of numbers #1, #3, and #4.

The relation of number #2 is excluded from the procedure [A_r]. The reason for this is that the relation of number #2 requires that the attribute "status" is "completion" but the attribute "status" of the relevant decision making procedure is "uncompleted".

Returning to the description with reference to FIG. 7.

Subsequently, the search procedure specification unit 104 determines whether or not the procedure [A_r] exists for the relation which is the process target (step S5).

As described above, positive results are acquired for the respective relations corresponding to numbers #1, #3, and #4, and a negative result is acquired for the relation of number #2.

In addition, in a case where the draft procedure, which is the starting point procedure, is the editing target (for example, in a case where the draft procedure is the procedure [A]), the previous procedure does not exist at all, and thus the negative result is acquired.

In a case where the negative result is acquired in step S5, the search procedure specification unit 104 returns to step S3, and another relation [rel], which is not an acquisition target, is acquired.

In contrast, in a case where the positive result is acquired in step S5, the search procedure specification unit 104 acquires an attribute set [ATTR] of the procedure [A_r] which is the process target (step S6).

In a case of the relation of number #1, all the attributes defined for the estimation procedure are acquired.

In a case of the relation of number #3, all the attributes defined for the draft procedure are acquired.

In a case of the relation of number #4, all the attributes defined for the payment procedure are acquired.

The procedure [A_r] does not exist for the relation of number #2, and thus acquisition of the attribute is not performed.

Subsequently, the search procedure specification unit 104 acquires one attribute [attr] from the acquired attribute set [ATTR] (step S7).

The attribute "attr" is an element of the attribute set [ATTR].

Here, the attribute [attr] is sequentially acquired, and processes in steps S7 to S9 are repeatedly performed until the non-processed attribute [attr] does not exist.

Subsequently, the search procedure specification unit 104 determines whether or not a value of the attribute [attr], which is the process target, coincides with the value [α] received in step S1 (step S8).

Here, a value, which coincides with the value [α], in the value of the attribute [attr], which is the process target, is an example of a second value.

In a case where the positive result is acquired in step S8, the search procedure specification unit 104 puts a combination of the relation [rel], which is the process target, with the attribute [attr], which includes the value [α], into a change rule set [R(X)] of the attribute [X], the setting of which is received in step S1, as the rule (step S9).

In the exemplary embodiment, labels of the relation set [REL] are used as the relations.

In a case where the negative result is acquired in step S8, the search procedure specification unit 104 returns to step S7.

Here, an attribute, which includes a value that coincides with the value [α] received in step S1, is extracted through a looping process in steps S7 to S9.

Figure 11:
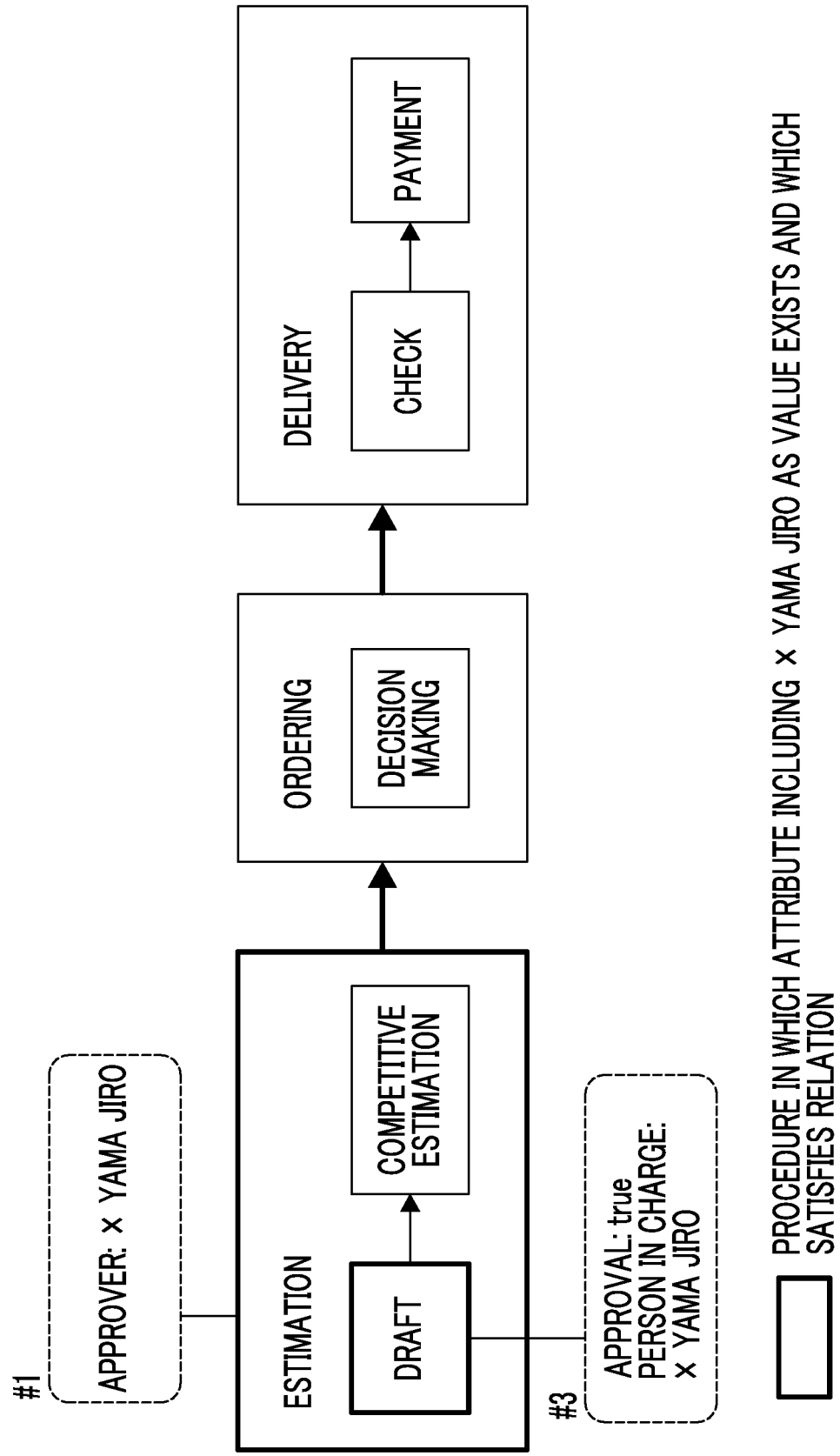
FIG. 11 is a diagram illustrating a procedure which includes a value set on the editing screen and which satisfies a relation prescribed using the relation set.

FIG. 11 is a diagram illustrating a procedure which includes a value that is set on the editing screen 150 (FIG. 8) and which satisfies the relation [rel] prescribed in the relation set [REL].

In FIG. 11, two procedures, that is, the estimation procedure, which is the new step, and the draft procedure, which is the step previous to the completion of the approval, are illustrated using the thick-bordered box.

Figures 12, 13:
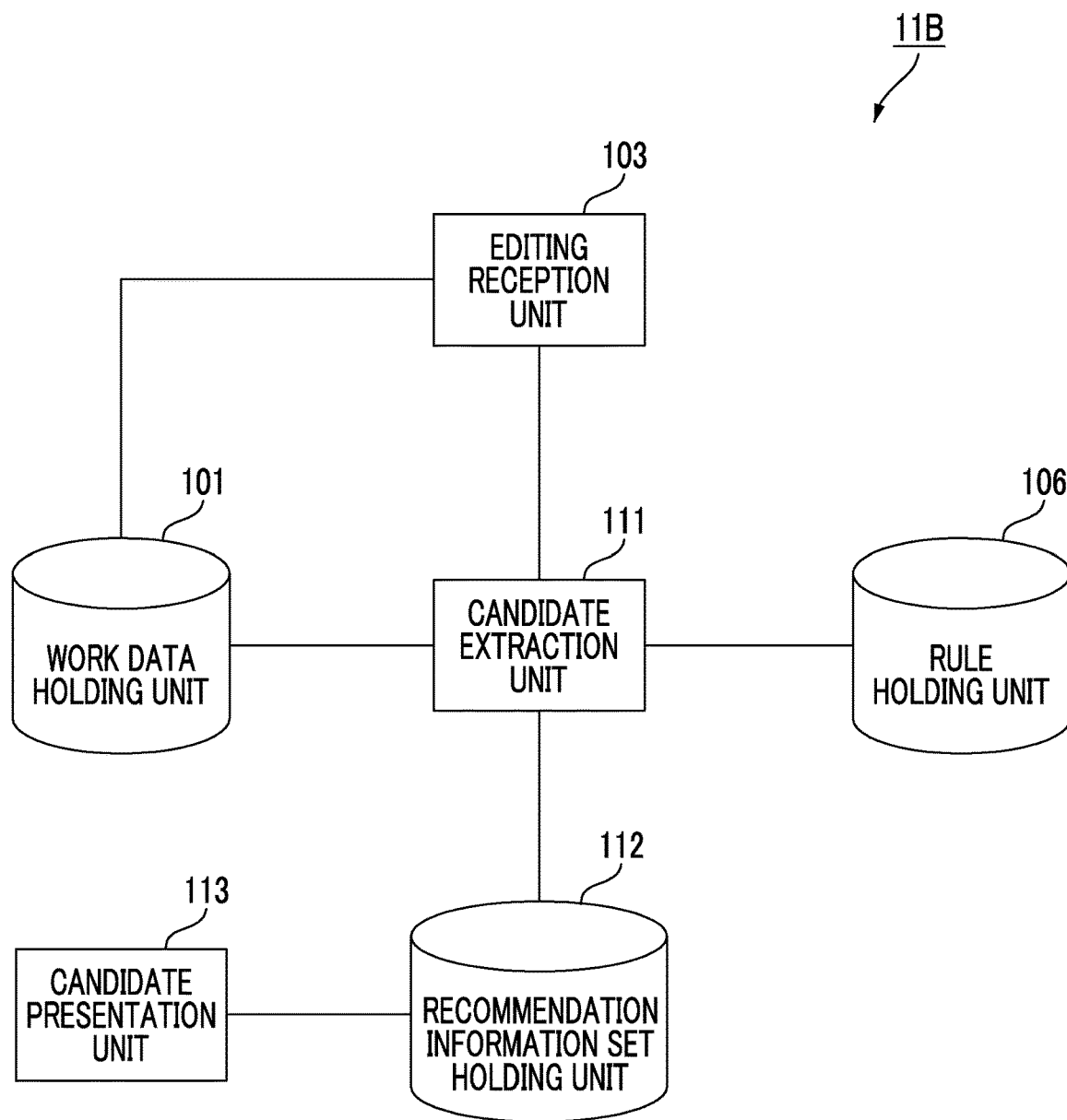
FIG. 12 is a diagram illustrating an example of a change rule set which is generated in accordance with a change in values of the competitive estimation procedure.
FIG. 13 is a diagram illustrating an example of a functional configuration of an attribute value candidate presentation unit.

FIG. 12 is a diagram illustrating an example of the change rule set [R(X)] which is generated in accordance with a change in values of the competitive estimation procedure.

The change rule set [R(X)] illustrated in FIG. 12 is prescribed using number # used to distinguish the rule, the label, and the attribute.

The label indicates content acquired by combining the relation between the procedures with a required attribute condition.

The attribute indicates the attribute [attr] in which a value that coincides with a value (xYAMA JIRO) set on the editing screen 150 (FIG. 8) is found.

In a case of FIG. 12, two steps, that is, the new step corresponding to the relation of number #1 (see FIG. 6) and the step previous to the completion of the approval corresponding to the relation of number #3 (see FIG. 6) are recorded as the elements of the change rule set [R(X)].

In addition, FIG. 12 prescribes that the value of the attribute [approver] is set as a candidate value for the new step and a value of an attribute [person in charge] is set as a candidate value for the step previous to the completion of the approval.

Functional Configuration Relevant to Attribute Value Candidate Presentation Unit 11B Hereinafter, a functional configuration and a processing operation, which are relevant to the attribute value candidate presentation unit 11B (see FIG. 4), will be described.

FIG. 13 is a diagram illustrating an example of a functional configuration of the attribute value candidate presentation unit 11B. In FIG. 13, the same reference symbols are attached to parts which are relevant to FIG. 5.

Some functions of the attribute value candidate presentation unit 11B are common to some functions of the attribute value change rule generation unit 11A.

That is, the attribute value candidate presentation unit 11B includes the work data holding unit 101, the editing reception unit 103, and the rule holding unit 106.

Figure 18:
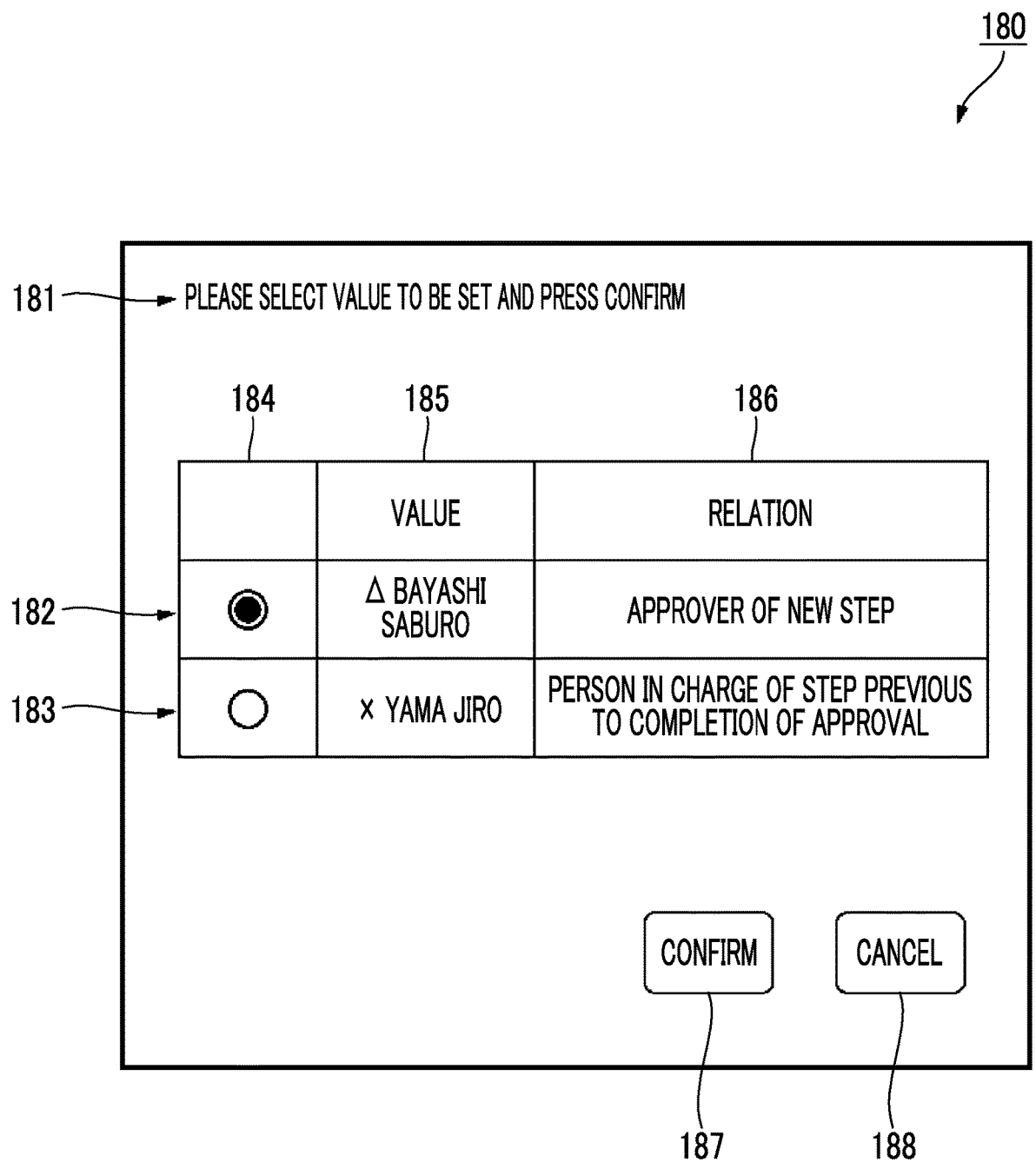
FIG. 18 is a diagram illustrating an example of a recommendation screen of candidate values (recommendation values) which are presented in a case where a hint button corresponding to a person in charge is operated.

A unique function of the attribute value candidate presentation unit 11B includes a candidate extraction unit 111 which extracts candidate values of an item that is the editing target from the work data holding unit 101 using the rule which is held in the rule holding unit 106, a recommendation information set holding unit 112 which preserves the extracted candidate values (recommendation values) in association with the attribute, and a candidate presentation unit 113 which presents the candidate values (recommendation values) on a recommendation screen 180 (see FIG. 18).

The candidate extraction unit 111 is an example of extraction unit. The candidate presentation unit 113 is an example of a presentation section.

Process for Presenting Candidates

Hereinafter, content of a process leading to presentation of the candidate values with respect to an item (attribute) which is being edited will be described with reference to FIGS. 14 to 18.

Figure 14:
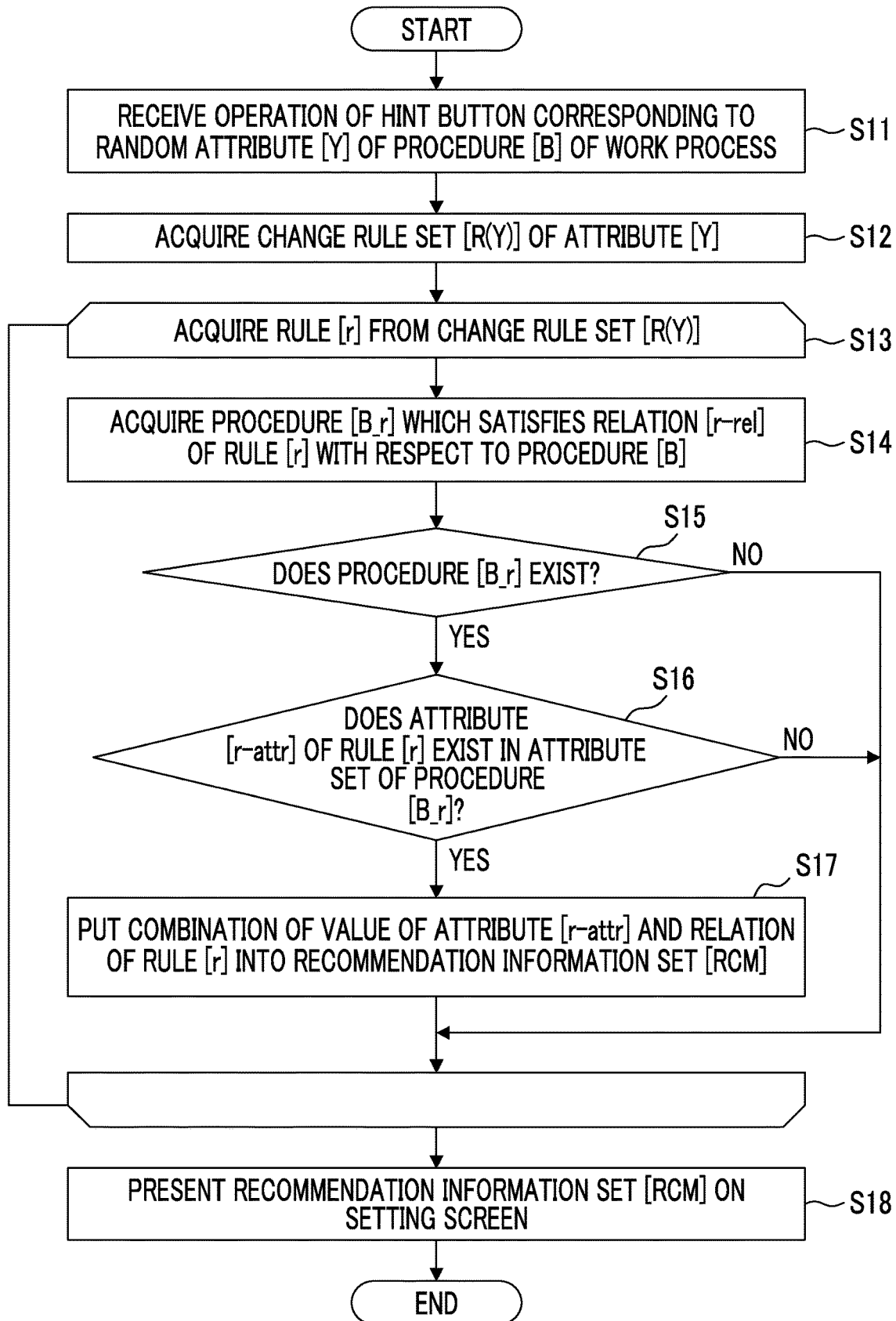
FIG. 14 is a flowchart illustrating an example of a candidate value presentation sequence which is performed in a case where a work data editing screen is displayed.

FIG. 14 is a flowchart illustrating an example of a candidate value presentation sequence which is performed in a case where a work data editing screen is displayed. In FIG. 14, a step is written in S.

First, the editing reception unit 103 (see FIG. 13) receives an operation of a hint button corresponding to a random attribute [Y] of a procedure [B] of the work process through the editing screen 150 (see FIG. 15) (step S11).

In a case of the exemplary embodiment, the work process is the ordering work, the procedure [B] is the decision making procedure, and the attribute [Y] is the person in charge.

A reason that step S11 is subject to the operation of the hint button is that a sequence illustrated in FIG. 14 is subject to the presentation of the candidate values.

Figure 15:
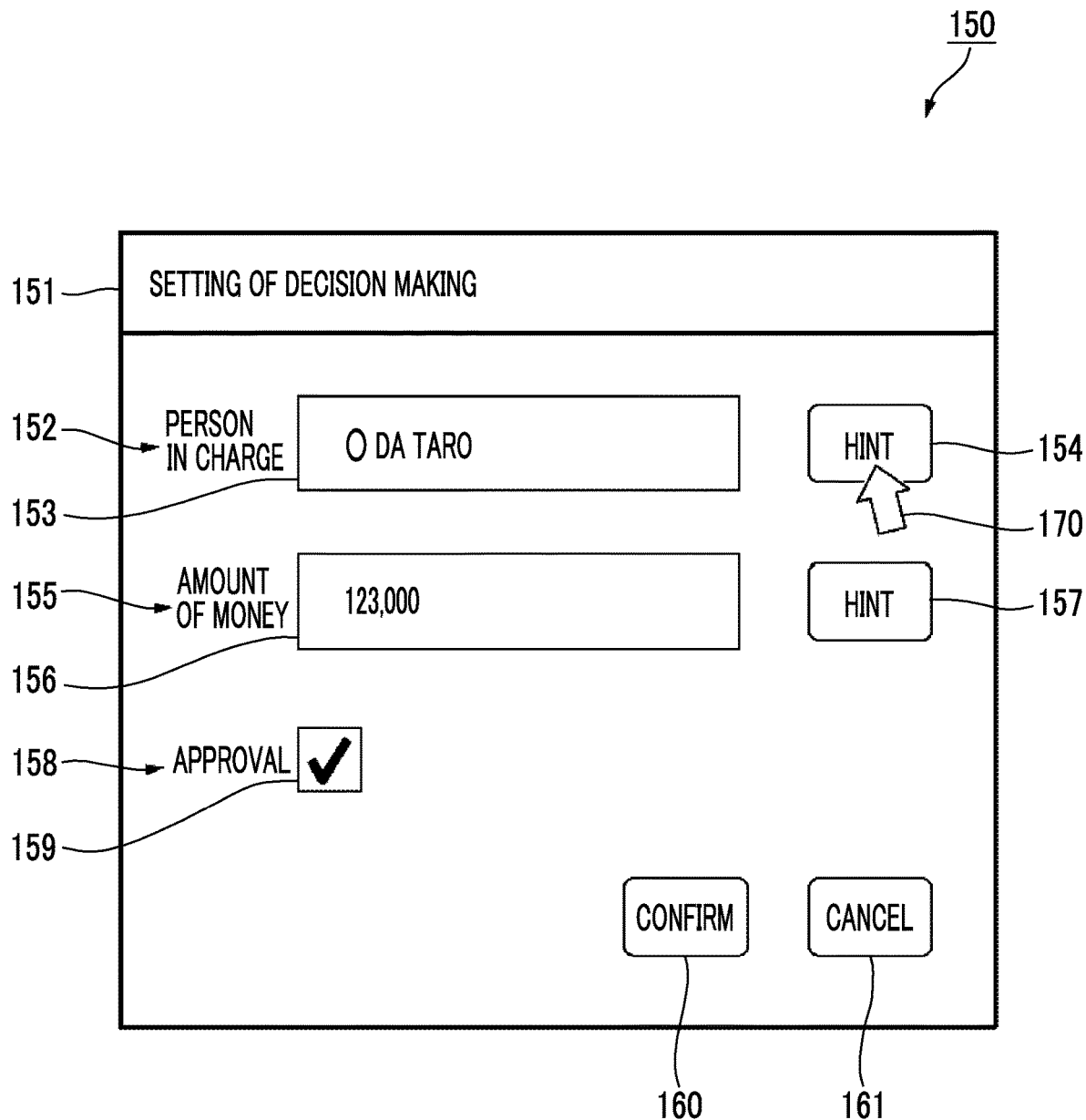
FIG. 15 is a diagram illustrating an example of an editing screen used to set attribute values relevant to a decision making procedure.

FIG. 15 is a diagram illustrating an example of the editing screen 150 used to set the attribute values relevant to the decision making procedure. In FIG. 15, the same reference symbols are attached to parts which are relevant to FIG. 8.

In a case of FIG. 15, "setting of decision making" is written in the title field 151.

In the case of FIG. 15, the editing target is the attribute "person in charge", and thus a mouse cursor 170 is located in a hint button 154 which is located on the right of the person in charge 152.

Figure 16:
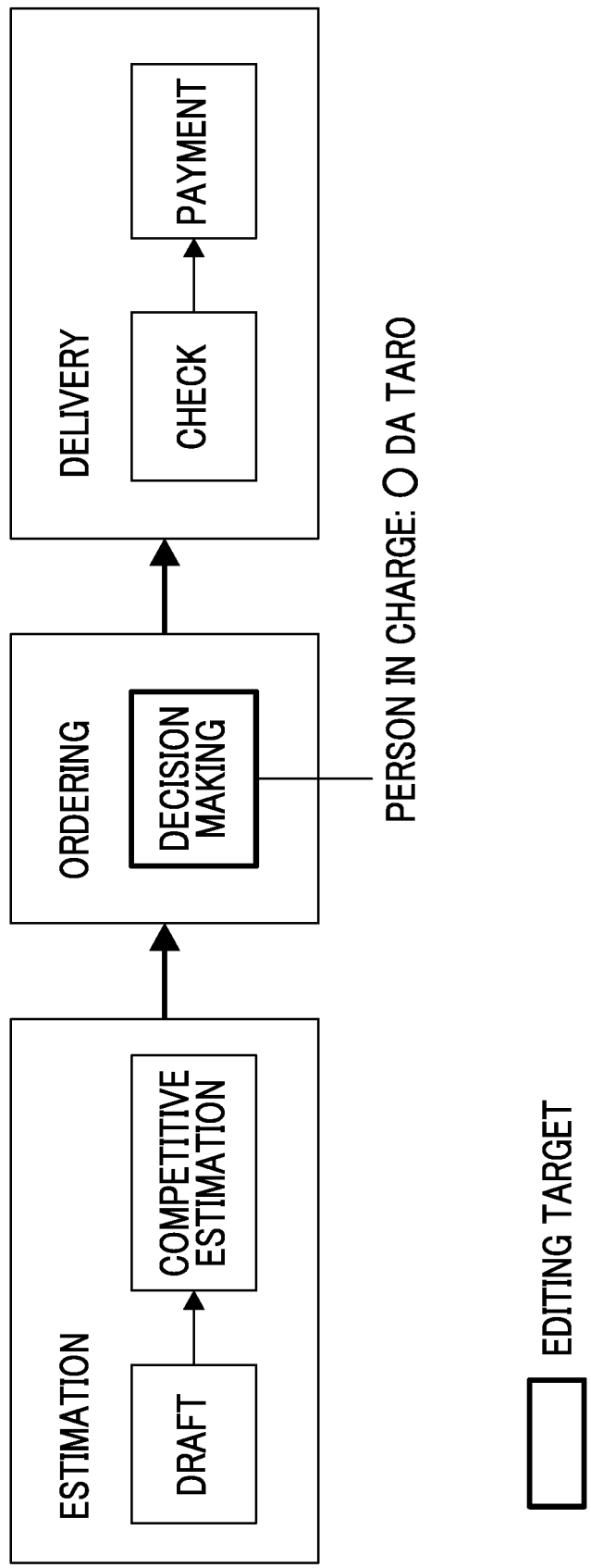
FIG. 16 is a diagram illustrating a location of the decision making procedure, which is the editing target, and contents of the attribute values.

FIG. 16 is a diagram illustrating a location of the decision making procedure, which is the editing target, and the content of the attribute value.

In FIG. 16, the decision making procedure, which is the current editing target, is illustrated by being surrounded using the thick-bordered box.

In a case of FIG. 16, "o DA TARO" is set as the attribute value in the attribute "person in charge".

Returning to description with reference to FIG. 14.

In a case where the attribute [Y], which is the editing target, is specified, the candidate extraction unit 111 acquires a change rule set [R(Y)] of the attribute [Y] from the rule holding unit 106 (step S12).

In the case of the exemplary embodiment, the attribute [Y] is the person in charge, and thus content of the change rule set [R(Y)] is the same as the content of the change rule set [R(X)] illustrated in FIG. 12.

Subsequently, the candidate extraction unit 111 acquires a rule [r] from the acquired change rule set [R(Y)] (step S13).

The rule [r] is an element of the change rule set [R(Y)].

Here, the rule [r] is sequentially acquired from number #1, and processes in steps S13 to S17 are repeatedly performed until a non-processed rule [r] does not exist.

Subsequently, the candidate extraction unit 111 acquires a procedure [B_r] which satisfies a relation [r-rel] of the rule [r] with respect to the procedure [B] (that is, the decision making procedure) (step S14).

Here, the relation includes the relation between the procedures and the attribute condition. That is, the procedure [B_r] satisfies not only the relation between the procedures but also the attribute condition.

Figure 17:
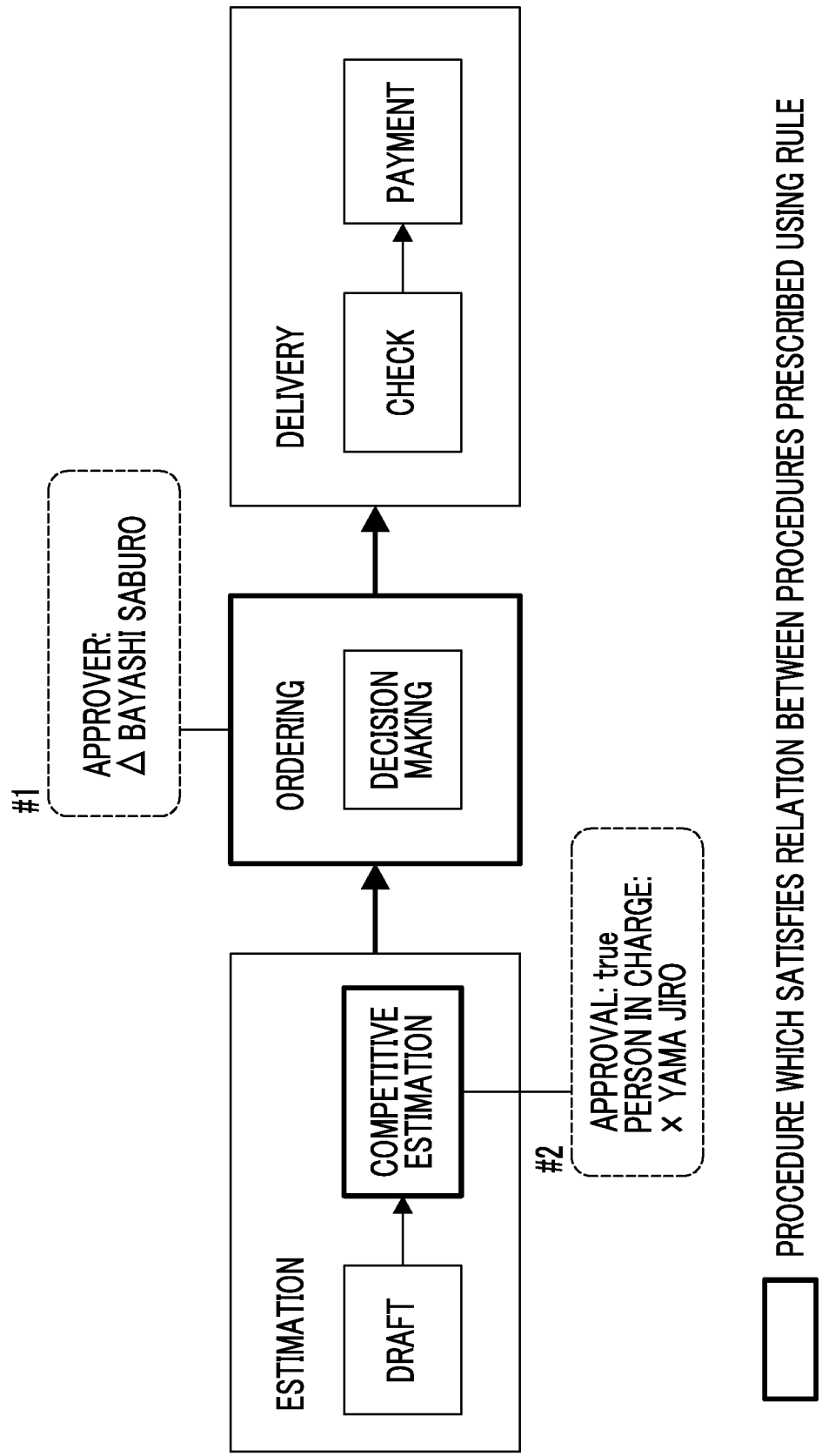
FIG. 17 is a diagram illustrating a location of a procedure which satisfies a relation between procedures prescribed through rules of numbers #1 and #2 in a case where the editing target is the decision making procedure.

FIG. 17 is a diagram illustrating a location of a procedure, which satisfies the relation between procedures that are prescribed through the rule [r] of numbers #1 and #2 in a case where the editing target is the decision making procedure.

FIG. 17 illustrates the procedure, which satisfies the relation between the procedures that are prescribed through the rule [r] of numbers #1 and #2, using a thick-bordered box.

The procedure, which satisfies the relation between the procedures, corresponding to number #1 is the ordering procedure corresponding to a higher procedure of the decision making procedure.

In the same manner, the procedure, which satisfies the relation between the procedures, corresponding to number #2 is the competitive estimation procedure corresponding to a previous procedure of the decision making procedure.

In step S14, the procedure [B_r], which satisfies not only the relation between the procedures but also the attribute condition prescribed using the rule [r], is acquired.

Here, the relation [r-rel] of the rule [r] corresponding to number #1 is the new step (higher procedure). Accordingly, the ordering procedure, which is the higher procedure of the decision making procedure, satisfies the relation [r-rel].

In contrast, the relation [r-rel] of the rule [r] corresponding to number #2 is the step previous to the completion of the approval (previous procedure). Accordingly, the competitive estimation procedure, which is the previous procedure of the decision making procedure and, further, is the attribute value of the "approval" attribute is true, satisfies the relation [r-rel].

Returning to description of FIG. 14.

Subsequently, the candidate extraction unit 111 determines whether or not the procedure [B_r] exists for the rule which is the process target (step S15).

In the case of the exemplary embodiment, the positive result is acquired for both the rules of numbers #1 and #2. Meanwhile, in a case where a negative result is acquired in step S15, the candidate extraction unit 111 returns to step S13, and acquires another rule [r] which is not the acquisition target.

In contrast, in a case where a positive result is acquired in step S15, the candidate extraction unit 111 determines whether or not an attribute [r-attr] of the rule [r] exists in an attribute set of the procedure [B_r] (step S16).

In a case where a negative result is acquired in step S16, the candidate extraction unit 111 returns to step S13, and acquires another rule [r] which is not the acquisition target.

In contrast, in a case where a positive result is acquired in step S16, the candidate extraction unit 111 puts a combination of a value of the attribute [r-attr] and a relation of the rule [r] for the procedure [B_r], which is the process target, into a recommendation information set [RCM] (step S17).

The recommendation information set [RCM] is preserved in the recommendation information set holding unit 112 (see FIG. 13).

In a case of FIG. 17, for the rule of number #1, a combination of "ΔBAYASHI SABURO", which is set as the attribute "approver", and the new step (higher procedure) is preserved in the recommendation information set [RCM].

In addition, for the rule of number #2, a combination of "xYAMA JIRO", which is set as the attribute [person in charge], and the step previous to the completion of the approval (previous procedure and the completion of the approval) is preserved in the recommendation information set [RCM].

FIG. 18 is a diagram illustrating an example of the recommendation screen 180 of the candidate values (recommendation values) which are presented in a case where the hint button 154 (see FIG. 15) corresponding to the person in charge is operated.

The recommendation screen 180 illustrated in FIG. 18 displays an explanatory note 181 which describes an operation required for the user, candidate values (recommendation values) 182 and 183, a button 184 which indicates a selection state of each of the candidate values (recommendation values), a field 185 which indicates content of each of the candidate values (recommendation values), a field 186 which indicates a relation in which each of the candidate values (recommendation values) is extracted, a confirmation button 187, and a cancellation button 188.

In a case of FIG. 18, ΔBAYASHI SABURO, which is extracted from the work data based on the rule of number #1, is selected. Here, in a case where the confirmation button 187 is operated, ΔBAYASHI SABURO is set in an input field 153 (see FIG. 15) of the person in charge 152 (see FIG. 15) on the editing screen 150 (see FIG. 15).

FIG. 18 illustrates not only ΔBAYASHI SABURO and xYAMA JIRO, which are the candidate values (recommendation values), but also relations in which the respective candidate values are extracted.

For example, FIG. 18 illustrates that ΔBAYASHI SABURO is an approver in the new step with respect to the decision making procedure which is being edited and that xYAMA JIRO is a person in charge in the step previous to the completion of the approval with respect to the decision making procedure which is being edited.

In a case where the relation field 186 is referred to, it is possible for the user to understand a relative location of a procedure in which the candidate values (recommendation values) are extracted, a progress situation of the procedure in which the candidate values (recommendation values) are extracted, and information of the attribute in which the candidate values (recommendation values) are extracted.

Therefore, it is possible for the user to effectively select a value, which is appropriate for the attribute that is the editing target, compared to a case where only the candidate values (recommendation values) are presented.

Another Exemplary Embodiment

Hereinabove, the exemplary embodiment of the present invention is described. However, a technical scope of the present invention is not limited to the scope described in the above exemplary embodiment.

With respect to the above-described exemplary embodiment, it is apparent that various changes or improved forms are included in the technical scope of the present invention from the description of claims.

Another Exemplary Embodiment 1

In a case of the above-described first exemplary embodiment, the search procedure specification unit 104 (see FIG. 5) determines whether or not the value of the attribute [attr], which is the process target, coincides with the value [α], which is received in step S1, in step S8 illustrated in FIG. 7. However, the value of the attribute [attr] may not completely coincide with the value [α].

For example, the determination in step S8 may be a value which satisfies a predetermined relation.

For example, in a case where the value [α] is a person, the value which satisfies the predetermined relation may be a value which indicates the same department (for example, a station, a department, a section, a room, a group, and a duty), the same position, the same right, and the same role.

The value, which satisfies the predetermined relation with respect to the value (first value) received in step S1, is an example of a second value.

Meanwhile, the coincidence is an example of the predetermined relation.

A detailed example will be described with reference to FIGS. 19 and 20.

Figure 19:
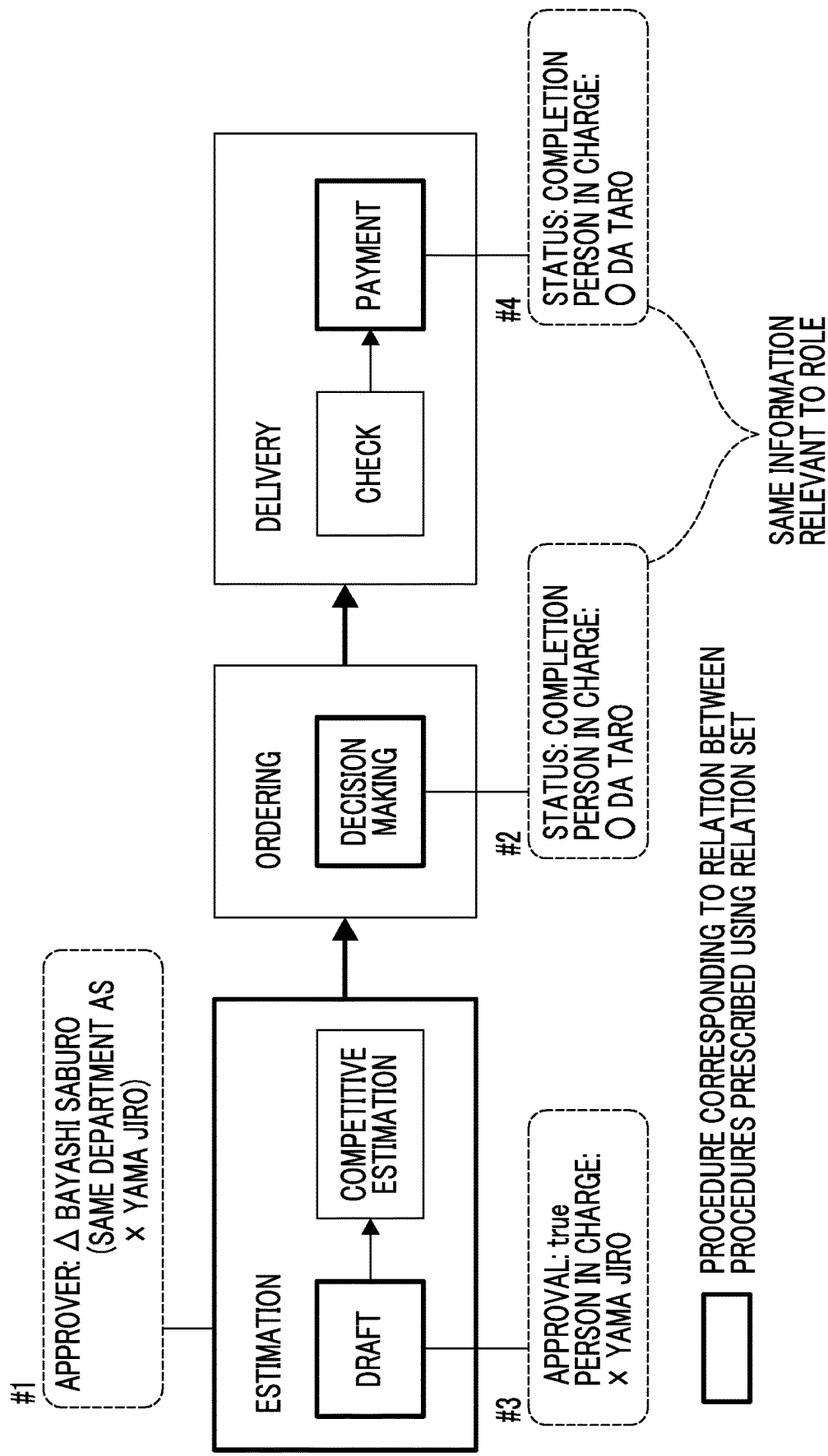
FIG. 19 is a diagram illustrating examples of the attribute values corresponding to the locations of the procedures which satisfy the relations between the procedures prescribed through the relations of numbers #1 to #4 in a case where the editing target is the competitive estimation procedure.

FIG. 19 is a diagram illustrating examples of the attribute values corresponding to the locations of the procedures which satisfy the relations between the procedures prescribed through the relations [rel] of numbers #1 to #4 in a case where the editing target is the competitive estimation procedure.

In FIG. 19, the same reference symbols are attached to parts which are relevant to FIG. 10.

In a case of FIG. 19, the approver of the estimation procedure, which satisfies the relation between the procedures prescribed through a relation [rel] of number #1, is replaced by ΔBAYASHI SABURO in the same department as in xYAMA JIRO.

In addition, a "status attribute" of the decision making procedure, which satisfies the relation between the procedures prescribed through the relation [rel] of number #2, is replaced by "completion", and the "person in charge" is replaced by "oDA TARO" who has the same role as "xYAMA JIRO".

In addition, the "status attribute" of the payment procedure, which satisfies the relation between the procedures prescribed through a relation [rel] of number #4, is replaced by the "completion", and "oDA TARO" who has the same role as "xYAMA JIRO" is set as the "person in charge".

In a case where the work data illustrated in FIG. 19 is processed using a method described according to the first exemplary embodiment, only a relation [rel] of number #3 is registered in the change rule set [R(X)].

Here, in a case where a value, which satisfies the predetermined relation, is allowed as determination performed in step S8, each of the relations [rel] of numbers #1 to #4 is registered in the change rule set [R(X)].

FIG. 20 is a diagram illustrating an example of the change rule set [R(X)] which is generated using a method according to a first modification example.

A data structure of the change rule set [R(X)] illustrated in FIG. 20 is the same as the data structure of the change rule set [R(X)] illustrated in FIG. 12.

In number #1, a fact that the relation, in which the attribute value that satisfies the predetermined relation is found, is the new step and a fact that the attribute, in which the attribute value is found, is the approver are prescribed.

In number #2, a fact that the relation, in which the attribute value that satisfies the predetermined relation is found, is a step subsequent to the completion and the fact that the attribute, in which the attribute value is found, is the "person in charge" are prescribed.

In number #3, a fact that the relation, in which the attribute value that satisfies the predetermined relation is found, is the step previous to the completion of the approval and the fact that the attribute, in which the attribute value is found, is the "person in charge" are prescribed.

In number #4, a fact that the relation, in which the attribute value that satisfies the predetermined relation is found, is the end step and the fact that the attribute, in which the attribute value is found, is the "person in charge" are prescribed.

Another Exemplary Embodiment 2

In the case of the above-described first exemplary embodiment, the search procedure specification unit 104 (see FIG. 5) preserves the combination of the relation [rel], in which the coincidence of the attribute value is confirmed, and the attribute [attr], in which the attribute value is found, in the change rule set [R(X)] as the rule in step S9 illustrated in FIG. 7. However, a fact that an evaluation value for each rule exceeds a predetermined reference may be set as a preservation condition.

For example, the number of occurrences, a value which is calculated based on a distance, strength of the connection, or the like is used as the evaluation value.

For example, in a case where an element of the attribute set [ATTR] of the certain procedure [A_r] includes the attribute "person in charge" and an attribute "sub-person in charge" and "xYAMA JIRO" is set as the respective attribute values, an evaluation value of the rule relevant to the procedure [A_r] which includes the two attributes may be set to "2".

In a case where the evaluation value is required to be equal to or larger than 2 as a reference for preservation, the rule corresponding to the two attributes is preserved in the change rule set [R(X)].

In addition, for example, in the evaluation value, a value which is calculated based on the distance from the procedure corresponding to the editing target maybe used. For example, a distance of the higher procedure may be set to 0 (zero), a distance between the previous procedure and the subsequent procedure may be set to 1, a distance up to the starting point procedure or the ending point procedure may be set to the number of procedures which exist up to the starting point procedure or the ending point procedure from the procedure corresponding to the editing target. In this case, as the distance is short, the procedure is treated as a high evaluation value. For example, the evaluation value may be calculated as a value acquired by subtracting the distance from a constant value.

In this case, for example, rules corresponding to the higher procedure, the previous procedure, and the subsequent procedure are preserved in the change rule set [R(X)].

In addition, for example, the strength of the connection with the attribute value of the procedure corresponding to the editing target may be used as the evaluation value.

For example, in a case where an attribute, which is the setting target, is the person in charge, estimation may be performed such that the attribute "person in charge", which is the same attribute, has stronger connection than the attribute "approver" or "sub-person in charge".

In addition, for example, a priority may be given in an order of the approver, the person in charge, and the sub-person in charge.

In a case where a function of calculating the evaluation value according to a predetermined rule is provided in the search procedure specification unit 104 (see FIG. 5), it is possible to preserve the relation according to strength of the relation (for example, the distance or the connection) or a degree of recommendation as the rule.

Another Exemplary Embodiment 3

In the case of the above-described first exemplary embodiment, the candidate extraction unit 111 (see FIG. 13) displays the recommendation values on the recommendation screen 180 according to an order of the rules which are used for extraction in step S18 illustrated in FIG. 14. However, the recommendation values, in which the evaluation value is high, may be preferentially displayed.

For example, the number of occurrences of the candidate value (recommendation value) may be used as the evaluation value and the candidate value (recommendation value), in which the number of occurrences is large, maybe disposed in a higher location.

In addition, for example, a value calculated based on the distance from the procedure corresponding to the editing target may be used as the evaluation value. For example, a distance of the higher procedure may be set to 0 (zero), the distance between the previous procedure and the subsequent procedure maybe set to 1, the distance up to the starting point procedure and the ending point procedure may be set to the number of procedures which exist up to the starting point procedure or the ending point procedure from the procedure corresponding to the editing target. In this case, as the distance is short, the procedure is treated as the high evaluation value. For example, the evaluation value may be calculated as a value acquired by subtracting the distance from the constant value.

In addition, for example, the strength of the connection with the attribute value of the procedure corresponding to the editing target may be used as the evaluation value.

For example, in a case where the attribute, which is the setting target, is the person in charge, estimation may be performed such that the attribute "person in charge", which is the same attribute, has stronger connection than the attribute "approver" or "sub-person in charge".

In addition, for example, the evaluation value may be set in order of the approver, the person in charge, and the sub-person in charge in the decreasing order.

In a case where a function of calculating the evaluation value according to the predetermined rule is provided in the candidate presentation unit 113 (see FIG. 13), it is possible to preferentially present a value according to the strength of the relation (for example, the distance or the connection) or a degree of the recommendation.

Another Exemplary Embodiment 4

In the description of the above-described exemplary embodiment, in a case where selection of the candidate value (recommendation value) performed by the user is confirmed, the selected candidate value (recommendation value) is input to the input field 153 (see FIG. 15). However, a structure, in which the extracted candidate value (recommendation values) is set even in a case where selection of the user is not performed, may be used.

The settings which do not require the selection of the user may be collectively performed with respect to the plurality of attributes of the plurality of procedures.

For example, in a case where the user previously designates an attribute [a] of the procedure "A" and an attribute [b] of the procedure [B], values which are respectively recommended for the attribute [a] and the attribute [b] may be set even in the case where the selection of the user is not performed.

In a case where content of the attribute [a] is the same as the content of the attribute [b], candidate values (recommendation values) are extracted using the same change rule set [R(X)]. Meanwhile, in the procedure "A" and the procedure [B], contents of the procedure which satisfies the rule are different from each other even using the same change rule set [R(X)], and thus there is a possibility that different values are presented as the candidate values (recommendation values).

In addition, in a case where the content of the attribute [a] is different from the content of the attribute [b], the change rule set, which is prepared according to each of the attributes, is used.

Another Exemplary Embodiment 5

In the above-described exemplary embodiment, the user designates the procedure, which is the editing target, and the attribute. However, in a case where the user designates the attribute value to be the editing target, an attribute, in which the attribute value is included, may be searched, and the attribute value, which is used to set each of the attributes, may be set using the change rule set [R(X)] corresponding to the searched attribute even though the selection of the user is not performed.

Another Exemplary Embodiment 6

In the above-described exemplary embodiment, in a case where the user sets the attribute value, generation of the change rule set [R(X)] is performed using the relation set [REL]. However, the change rule set [R(X)] may be given in advance. For example, the change rule set [R(X)] may be manually prepared.

Another Exemplary Embodiment 7

In the above-described exemplary embodiment, a case where the function of the attribute value change rule generation unit 11A and the function of the attribute value candidate presentation unit 11B are performed as a part of the function of the work process management server 10 is described. However, the function of the attribute value change rule generation unit 11A and the function of the attribute value candidate presentation unit 11B may be performed in devices which are independent from each other.

Figure 21:
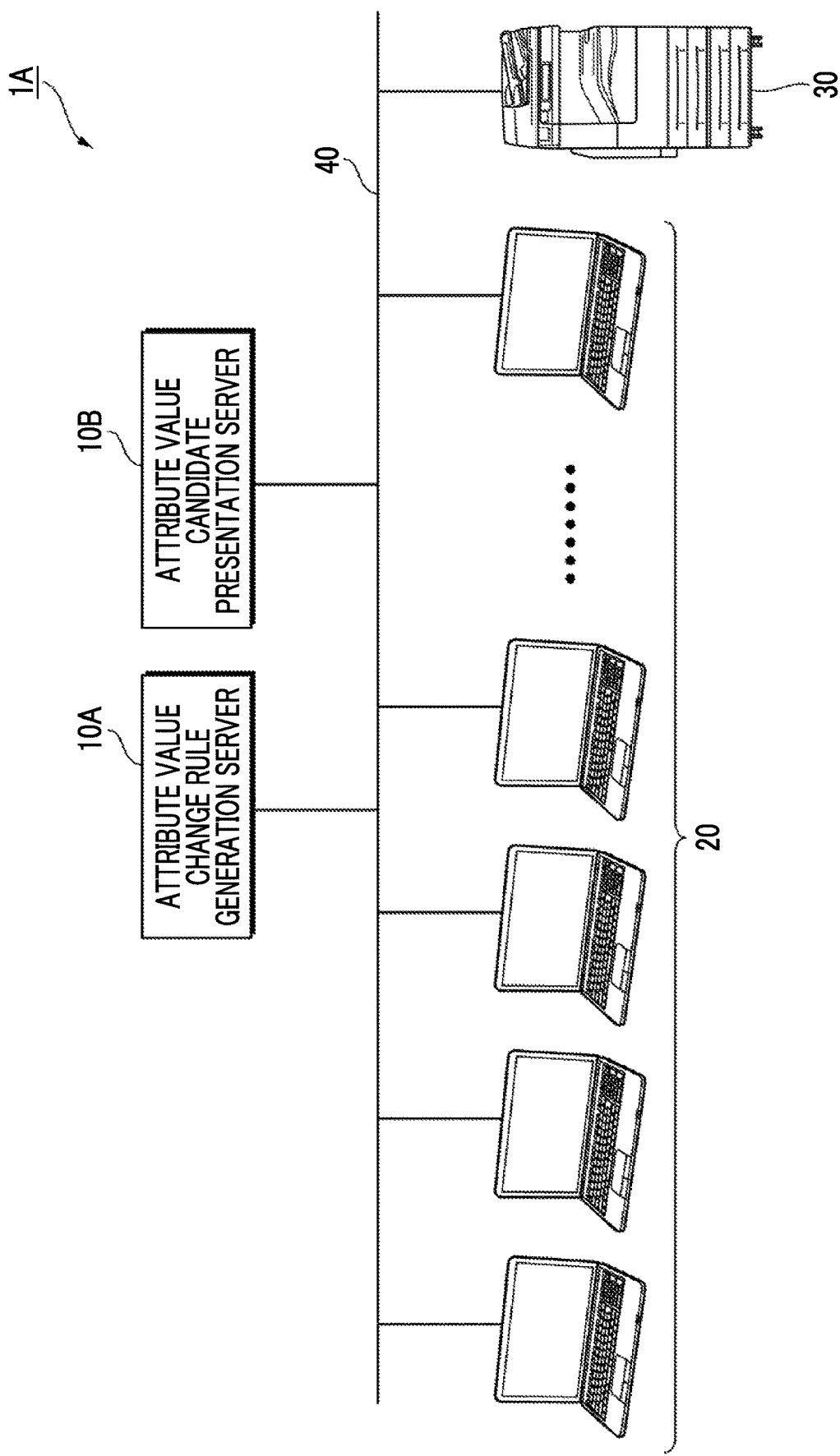
FIG. 21 is a diagram illustrating an example of a configuration of a work management system according to another exemplary embodiment.

FIG. 21 is a diagram illustrating an example of a configuration of a work management system 1A according to another exemplary embodiment.

In FIG. 21, the same reference symbols are attached to parts which are relevant to FIG. 1.

In a case of the work management system 1A, a system configuration is provided in which an attribute value change rule generation server 10A which performs the function of the attribute value change rule generation unit 11A and an attribute value candidate presentation server 10B which performs the function of the attribute value candidate presentation unit 11B are connected to the network 40.

Here, the attribute value change rule generation server 10A and the attribute value candidate presentation server 10B are examples of an information processing apparatus. In addition, the work management system 1A is an example of an information process system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An information processing apparatus comprising:
a processor, configured to:
receive a designation of an item to be an operation target on a screen used to operate data on a work which includes a plurality of procedures; and
present a candidate value for the ite which is the operation target, and locational information of a procedure, in which the candidate value is extracted, on the screen.
2. The information processing apparatus according to claim 1,
wherein the locational information includes information of a rule which is used in a case where the candidate value is extracted.
3. The information processing apparatus according to claim 2,
wherein the information of the rule is information relevant to progress of the procedure.
4. The information processing apparatus according to claim 2,
wherein the information of the rule is information of an item in which the candidate value is to be extracted.
5. The information processing apparatus according to claim 1,
wherein the locational information is expressed using a procedure, which includes the item, which is the operation target, as an origin.
6. The information processing apparatus according to claim 1, wherein the processor is further configured to:
in a case where a setting for the item to be the operation target is received on the screen, searches search for another procedure which includes a second value in a predetermined relation with respect to a set first value; and set a locational relation of the other procedure with respect to a procedure, in which the first value is set, and an item, which includes the second value in the other procedure, as a rule used to extract the candidate value.

7. The information processing apparatus according to claim 6, wherein the processor searches for the other procedure within a range which satisfies the locational relation that is previously designated with respect to the procedure in which the first value is set.

8. The information processing apparatus according to claim wherein the candidate value is extracted using a rule acquired from an apparatus including another processor that, in a case where a setting for the item to be the operation target is received on the screen, searches for another procedure which includes a second value in a predetermined relation with respect to a set first value, and that sets a locational relation of the other procedure with respect to a procedure, in which the first value is set, and an item, which includes the second value in the other procedure, as the rule used to extract the candidate value.

9. An information processing apparatus comprising:

a processor, configured to:

in a case where a setting for an item to be an operation target is received on a screen used to operate data on a work which includes a plurality of procedures, search for another procedure which includes a second value in a predetermined relation with respect to a set first value; and set a locational relation of the other procedure with respect to a procedure, in which the first value is set, and an item, which includes the second value in the other procedure, as a rule used for a user to extract a candidate value for the item to be the operation target from the data on the work.

10. The information processing apparatus according to claim 9, wherein the processor searches for the other procedure within a range which satisfies the locational relation that is previously designated with respect to the procedure in which the first value is set.

11. The information processing apparatus according to claim 10, wherein, in the locational relation, a condition relevant to progress of the procedure is set.

12. The information processing apparatus according to claim 9, wherein the candidate value corresponds to a person in charge or an approver or the procedure.

13. The information processing apparatus according to claim 9, wherein the first value, the second value, and the candidate value correspond to persons in charge or approvers within a same department.

14. A non-transitory computer readable medium storing a program causing a computer to:

receive a designation of an item to be an operation target on a screen used to operate data on a work which includes a plurality of procedures; and present a candidate value for the item, which is the operation target, and locational information of a procedure, in which the candidate value is extracted, on the screen.

15. The information processing apparatus according to claim 9, wherein the first value, the second value, and the candidate value correspond to persons in charge or approvers having same roles or same approval rights.

* * * * *